(12) United States Patent
Bakos et al.

(10) Patent No.: US 11,384,712 B1
(45) Date of Patent: Jul. 12, 2022

(54) ACTIVE CONTROL OF SCRAMJET ISOLATOR SHOCK SYSTEMS

(71) Applicant: Innoveering, LLC, Ronkonkoma, NY (US)

(72) Inventors: Robert Bakos, Wading River, NY (US); Jiaji Lin, Flushing, NY (US); Adelbert Francis, St. Louis, MO (US); Stephen A. Beckel, Jupiter, FL (US)

(73) Assignee: INNOVEERING, LLC, Ronkonkoma, NY (US)

( * ) Notice: Subject to any disclaimer, the term of this patent is extended or adjusted under 35 U.S.C. 154(b) by 263 days.

(21) Appl. No.: 16/806,306

(22) Filed: Mar. 2, 2020

Related U.S. Application Data

(60) Provisional application No. 62/812,392, filed on Mar. 1, 2019.

(51) Int. Cl.
*F02K 7/14* (2006.01)
*F02C 9/28* (2006.01)

(52) U.S. Cl.
CPC ............ *F02K 7/14* (2013.01); *F02C 9/28* (2013.01); *F05D 2270/301* (2013.01)

(58) Field of Classification Search
CPC ......... F02K 7/14; F02C 9/28; F05D 2270/301
See application file for complete search history.

(56) References Cited

U.S. PATENT DOCUMENTS

| 2008/0092519 A1* | 4/2008 | Bulman | F02K 7/10 60/204 |
| 2018/0347461 A1* | 12/2018 | Cicchini | F02K 7/10 |
| 2019/0170089 A1* | 6/2019 | Cicchini | F02K 7/00 |

OTHER PUBLICATIONS

Hutzel, J.R., Decker, D.D., Cobb, R.G., King, P.I., and Veth, M.J., "Scramjet Isolator Shock Train Location Techniques," AIAA 2011-402, Jan. 2011. doi: I0.2514/6.2011-402.
Sajben, M., Donovan, J.F. and Morris, M.J., "Experimental Investigation or Terminal Shock Sensors for Mixed-Compression Inlets," Journal of Propulsion and Power, vol. 8. No. 1. Jan.-Feb. 1992, pp. 168-174. doi: 10.2514/3.23457.
Le, D.B., Goyne C., and Krauss, R. "Shock Train Leading-Edge Detection in a Dual-Mode Scramjet," Journal of Propulsion and Power, vol. 24, No. 5, Sep.-Oct. 2008, pp. 1035-1041. doi: 10.2514/1.32592.
Srikant, S., Wagner, J.L., Valdivia, A., Akella, M.R., and Clemens. N., "Unstart Detection in a Simplified-Geometry Hypersonic Inlet-Isolator Flow," Journal of Propulsion and Power. vol. 26, No. 6, Sep.-Oct. 2010, pp. 1059-1071. doi: 10.2514/1.46937.

(Continued)

*Primary Examiner* — Joseph J Dallo
(74) *Attorney, Agent, or Firm* — Carter, DeLuca & Farrell LLP; George Likourezos

(57) ABSTRACT

This disclosure relates to a system for actively controlling shock train in a high speed, air-breathing propulsion engine. The system includes an isolator, a sensor associated with the isolator, and a shock train fuel injector in electrical communication with the sensor. The sensor is configured to sense changes in pressure generated by a shock train in the isolator. The shock train fuel injector is in electrical communication with the sensor. The shock train fuel injector is configured to modulate fuel flow to the engine to control back pressure produced by the engine in response to predetermined pressure changes in the shock train.

20 Claims, 18 Drawing Sheets

(56) References Cited

OTHER PUBLICATIONS

Donbar, J.M., Linn, G., Srikant, S., and Akella, M.R., "High Frequency Pressure Measurements for Unstart Detection in Scramjet Isolators" AIAA 2010-6557, Jul. 2010. doi: I0.2514/6.2010-6557.

Dustin, M.O., Cole G.L., and Neiner G.H., "Continuous-Output Terminal-Shock-Position Sensor for Mixed-Compression Inlets Evaluated in Wind-Tunnel Tests or YF-12 Aircraft Inlets", NASA Technical Memorandum X-3144, Dec. 1974.

Global Climatic Handbook for Developing Military Products, MIL-HDBK-3 I0, Jun. 23, 1997.

Tsai, C.Y. and Bakos, R.J., "Shock-Tunnel Flow Visualization with a High-Speed Schlieren and Laser Holographic Interferometry System," AIAA-98-2700. Jun. 1998. doi: I0.2514/6.1998-2700.

Ridings, A.N. and Smart, M.K., "Investigation of the Flow Establishment of Pre-Combustion Shock Trains in a Shock Tunnel," AIAA 2015-3505, Jul. 2015. doi: I0.2514/1.J055590.

Donbar, J.M., "Shock Train Position Control in an Axisymmetric Scramjet Combustor Flowpath." AIAA 2012-4145. Jul.-Aug. 2012. doi: I0.2514/6.2012-4145.

Wu, H., Hu, J., and Xie, Y., "Characteristic model based all-coefficient adaptive control method and its applications," IEEE Transactions on Systems. Man, and Cybernetics, Part C: Applications and Reviews, vol. 37, No. 22, Feb. 2007, pp. 213-221. doi: I0.1109/TSMCC.2006.887004.

Di, L. and Lin, Z., "Control of a Flexible Rotor Active Magnetic Bearing Test Rig: A Characteristic Model Based All-Coefficient Adaptive Control Approach", Control Theory and Technology, vol. 12, No. 1, Jan. 2014, pp. 1-12. doi: 10.1007/sl1768-014-0184-0.

Matsuo, K., Miyazato, Y., Kim, H.D., "Shock train and pseudo-shock phenomena in internal gas flows," Progress in Aerospace Sciences, vol. 35, No. 1, Jan. 1999, pp. 33-100. doi: 10.1016/30376-0421(98)00011-6.

Zhang, X., Palazzolo, A., Kweon, C., Thomas, E., Tucker, R., "Direct Fuel Injector Temporal Measurements," SAE International, SAE Technical Paper 2014-01-1444. Apr. 8-10, 2014. doi: I0.4271/2014-01-1444.

Ashley, J.M., Szmuk, M., Clemens, N.T., Akella. M.R., Gogineni, S., and Donbar, J.M., "Closed-loop Control of Shock Location in Mach 1.8 Direct Connect Wind Tunnel", AIAA 2014-2935. Jun. 16-20, 2014. doi: I0.2514/6.2014-2935.

JiaJi Lin, et al. "Active Control of Scramjet Isolator Shock Systems", International Traffic in Arms Regulations (ITAR) 22 CFR 120-130, pp. 1-33.

\* cited by examiner

ACTIVE CONTROL OF SCRAMJET ISOLATOR SHOCK SYSTEMS

CROSS-REFERENCE TO RELATED APPLICATIONS

This application claims the benefit of U.S. Provisional Patent Application No. 62/812,392, filed on Mar. 1, 2019, entitled "ACTIVE CONTROL OF SCRAMJET ISOLATOR SHOCK SYSTEMS," the entire contents of which are incorporated herein by reference.

STATEMENT OF GOVERNMENT SUPPORT

This invention was made with U.S. government support under contract numbers FA8650-16-C-2715 awarded by the U.S. Air Force and 140D6318C0110 awarded by DARPA (Administered by the Department of the Interior). The U.S. government has certain rights in the invention.

BACKGROUND

A scramjet (supersonic-combustion ramjet) is a ramjet engine in which the airflow through the engine remains supersonic, or greater than the speed of sound. In a dual-mode scramjet, the inlet isolator is a constant area or slightly diverging section that provides for pre-combustion pressure rise from the inlet conditions to the backpressure imposed by heat release in the combustor. This diffusion process is accomplished through a series of normal or oblique shock waves called a shock train which grows in length as the backpressure increases or the in now momentum decreases. If the shock-train length exceeds the length of the isolator, it immediately unstarts the inlet. Unstart events are severe at hypersonic conditions and at a minimum required time for a restart procedure. In the worst case, the severe unstart loads will cause loss of vehicle control.

SUMMARY

This disclosure relates to systems and methods for actively controlling shock train in a high speed, air-breathing propulsion engine and, more particularly, to constraining shock train in a scramjet engine system.

In accordance with aspects of this disclosure, a system for actively controlling shock train in a high speed, air-breathing propulsion engine is presented. The system includes an isolator, and a sensor disposed in the isolator. The sensors are configured to sense a pressure change generated by a shock train in the isolator. The system further includes a shock train fuel injector, a processor operatively coupled to the sensors, and a memory, with instructions stored thereon. The instructions, when executed by the processor, cause the system to: sense, by the sensor, the pressure change to establish a sensed pressure change; determine a position of the shock train relative to the isolator based on the sensed pressure change to establish a shock train position; and communicate with the shock train fuel injector based on the shock train position to enable the shock train fuel injector to modulate fuel flow to the engine to control back pressure produced by the engine to limit unstart.

In a further aspect of the present disclosure, the instructions when executed by the processor may further cause the system to: convert the determined shock train position to a position identification, wherein the position identification includes a leading-edge shock location position and control the leading edge-shock train location position by the feedback controller. The feedback controller may be configured to control back pressure produced by the engine.

In yet a further aspect of the present disclosure, the processor may have a feedback controller.

In yet another aspect of the present disclosure, the sensor may include a pressure transducer. In various embodiments, a sensor may include multiple sensors and a pressure transducer may include multiple pressure transducers. In various embodiments, the sensor may include sensors capable of detecting a shock wave to include but not limited to pressure, wall shear stress, and/or wall heat flux.

In a further aspect of the present disclosure, the shock train fuel injector may include: a direct injector inlet configured to receive fuel from a fuel source, a direct injector configured to supply the fuel to the engine, and a fast-acting direct injector valve configured to modulate the flow of the fuel to control back pressure produced by the engine.

In an aspect of the present disclosure, the system may further include a pulse width modulation (PWM) power amplifier, which is further configured to control fuel flow to the engine by providing current to the fast-acting direct injector valve.

In another aspect of the present disclosure, controlling the leading edge-shock train location position may include determining when to actuate the shock train fuel injector based on the position identification and causing the shock train fuel injector to modulate the fuel flow when a determination to actuate the shock train fuel injector is communicated by the feedback controller to the shock train fuel injector.

In another aspect of the present disclosure, the fast-acting direct injector valve may be disposed on an end face of the direct injector.

In yet another aspect of this disclosure, the feedback controller may minimize a difference between a desired leading-edge shock location and an actual shock location.

In a further aspect of the present disclosure, the system may be configured to move the position of the shock train relative to the isolator in about 10 milliseconds or less. In yet another aspect of this disclosure, a ratio of a response time of the system to a response time of the engine may be as low as about 1:5 and as high as about 1:10.

In yet another aspect of this disclosure, the shock train fuel injector may be disposed in electrical communication with the feedback controller.

In accordance with aspects of this disclosure, a system for actively controlling shock train in a high speed, air-breathing propulsion engine is presented. The system includes an isolator; a sensor associated with the isolator, the sensor configured to changes in pressure generated by a shock train in the isolator; and a shock train fuel injector in electrical communication with the sensor, the shock train fuel injector configured to modulate fuel flow to the engine to control back pressure produced by the engine in response to predetermined pressure changes in the shock train.

In aspects, a feedback controller may be disposed in electrical communication with the sensor and the shock train fuel injector.

In aspects, the sensor may include a pressure transducer, but not limited to pressure sensing.

In some aspects, the shock train fuel injector may include a direct injector inlet configured to receive fuel from a fuel source, a direct injector configured to supply the fuel to the engine, and a fast-acting direct injector valve configured to modulate the flow of the fuel to control back pressure produced by the engine.

In other aspects, the system may further include a pulse width modulation (PWM) power amplifier that provides current to the fast-acting direct injector valve.

In accordance with aspects of this disclosure, a method for actively controlling shock train in a high speed, air-breathing propulsion engine system is provided. The method includes determining, by a sensor, a change in pressure in an isolator of the scramjet engine system, determining a location of a leading-edge of a shock train in the isolator based on the change in pressure in the isolator determined by the sensor, and actuating a shock train fuel injector in electrical communication with the sensor to modulate fuel flow in a scramjet engine of the scramjet engine system based on the location of the leading-edge of the shock train in the isolator to control back pressure produced by the scramjet engine system.

In aspects, the method may include controlling the location of the leading edge of the shock train by a feedback controller in electrical communication with the sensor.

In a further aspect of the present disclosure, the steps of determining, by the sensor, the change in pressure in the isolator, determining the location of a leading-edge of the shock train in the isolator, and actuating the shock train fuel injector are effectuated within about 10 milliseconds or less.

The details of one or more aspects of this disclosure are set forth in the accompanying drawings and the description below. Other aspects, features, and advantages will be apparent from the description, the drawings, and the claims that follow.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

Figure 1:
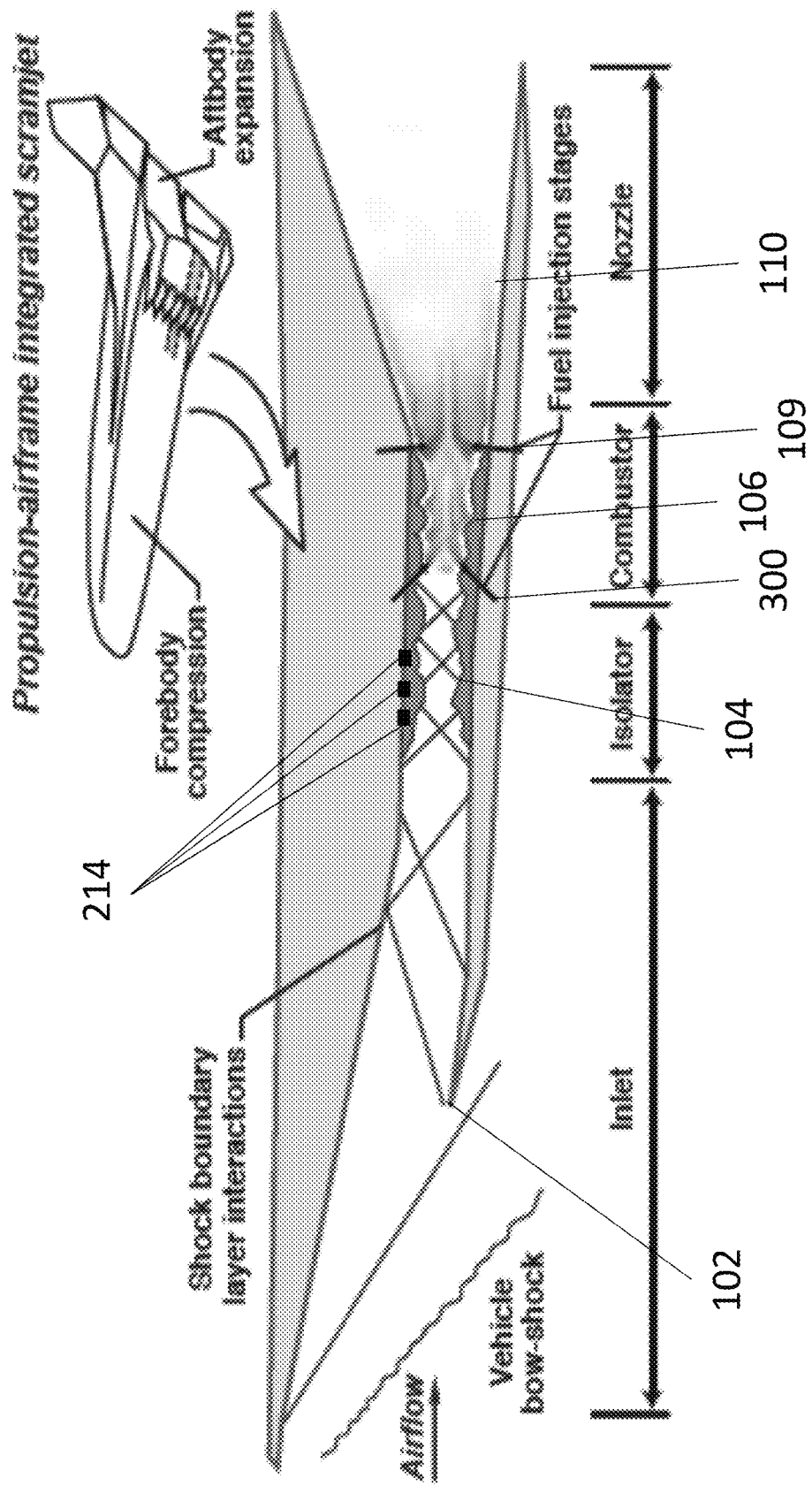
FIG. 1 is a block diagram of one embodiment of a system for actively controlling a shock train.
Figure 2B:
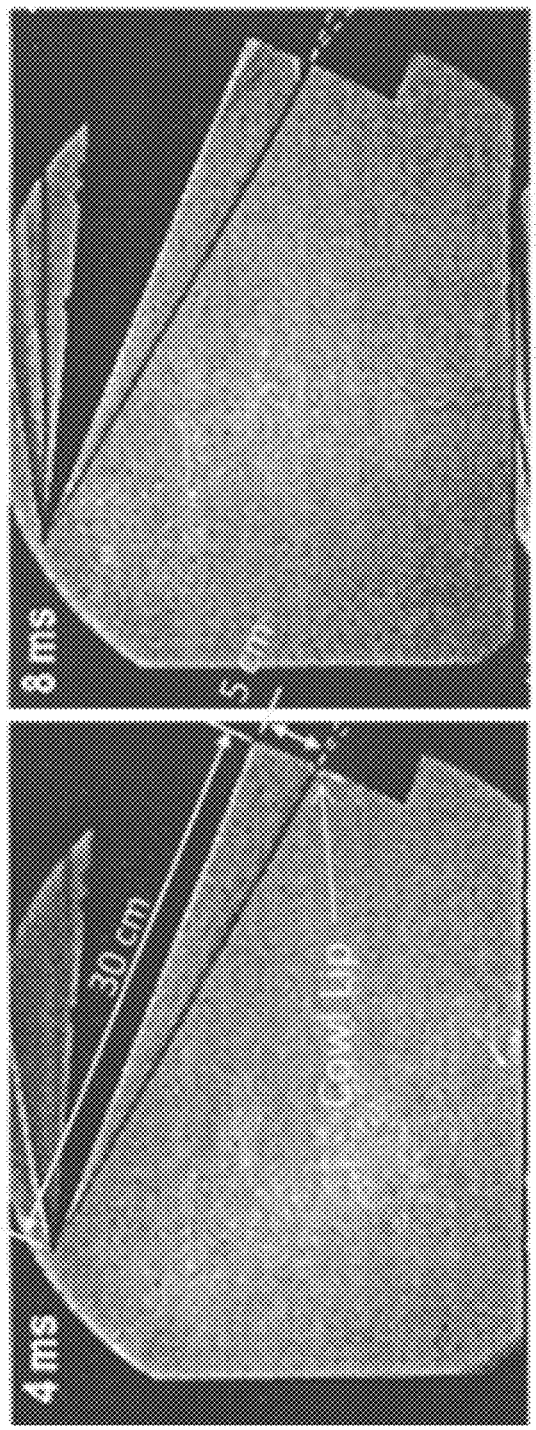
FIGS. 2A-D are Schlieren images for a hydrogen/silane fueled combustor being tested in a shock tunnel.
Figure 2D:
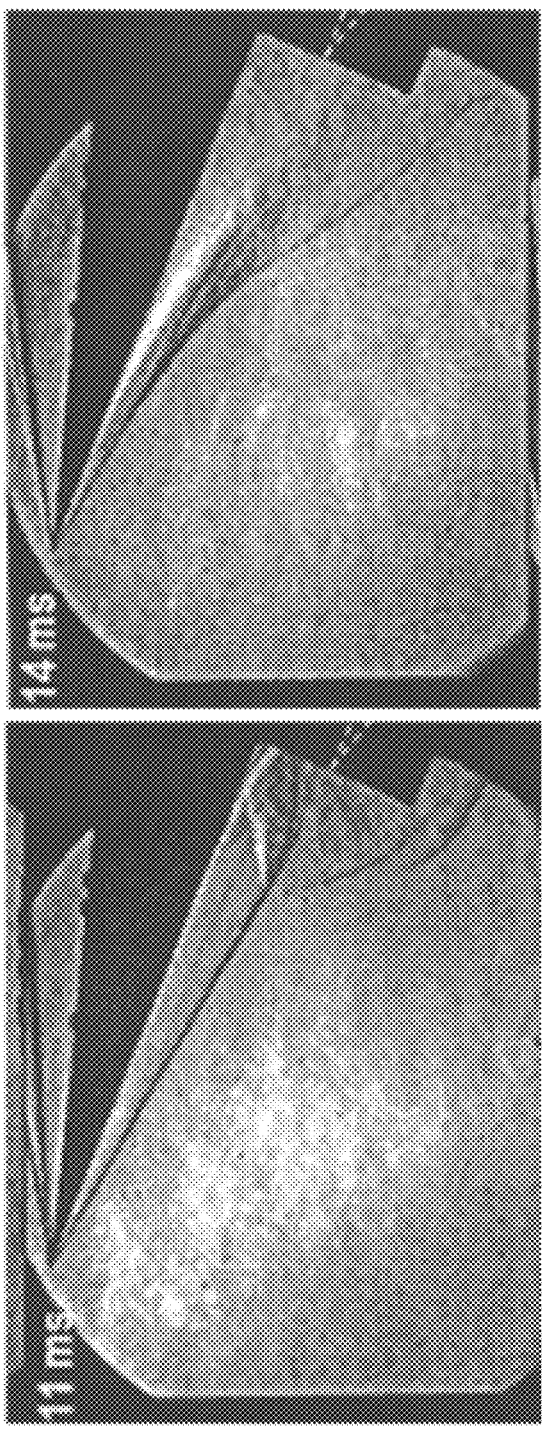
Figure 2A:
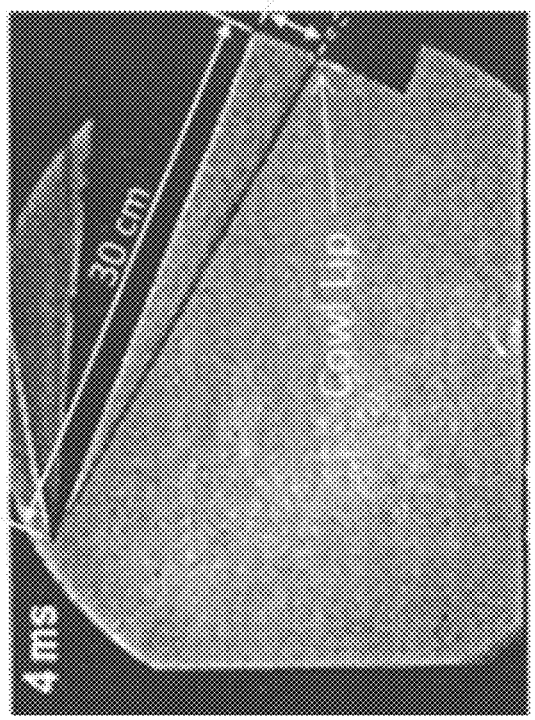
Figure 2C:
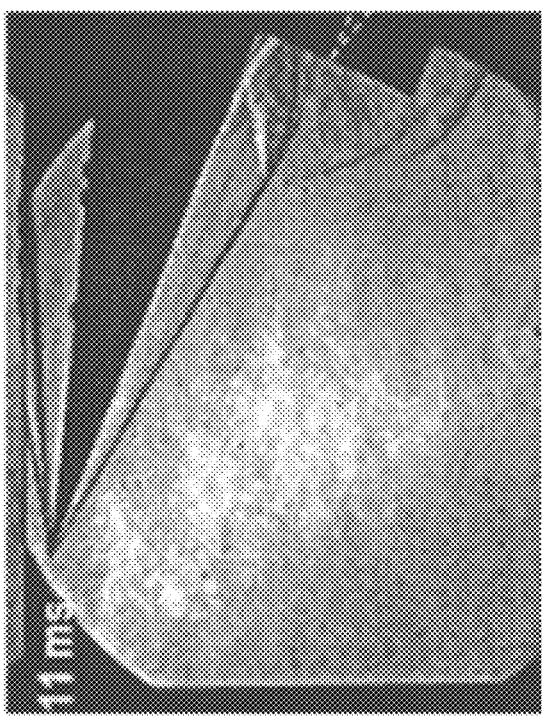

Further details and aspects of exemplary embodiments of the disclosure are described in more detail below with reference to the appended figures. Any of the above aspects and embodiments of this disclosure may be combined without departing from the scope of the disclosure.

DETAILED DESCRIPTION

This disclosure relates to systems and methods for constraining shock train in a scramjet engine system, and, more particularly, to actively controlling shock train in a high speed, air-breathing propulsion engine.

Although this disclosure will be described in terms of specific embodiments, it will be readily apparent to those skilled in this art that various modifications, rearrangements, and substitutions may be made without departing from the spirit of this disclosure.

For purposes of promoting an understanding of the principles of this disclosure, reference will now be made to exemplary embodiments illustrated in the drawings, and specific language will be used to describe the same. It will nevertheless be understood that no limitation of the scope of this disclosure is thereby intended. Any alterations and further modifications of the inventive features illustrated herein, and any additional applications of the principles of this disclosure, as illustrated herein, which would occur to one skilled in the relevant art and having possession of this disclosure, are to be considered within the scope of this disclosure.

The shock train length can be expected to be at its maximum when there is a combination of low momentum isolator inflow and high backpressure at the exit. These conditions occur during initial scramjet-powered fly-out when the vehicle is strongly accelerating, and its Mach number is still low. Shock train length can also increase during significant vehicle maneuvers when inlet operation is off-design and the flow at the isolator entrance is highly distorted. In either case, its length is difficult to predict, and common practice is to design ample isolator length margin into the engine. An alternative approach is to constrain the shock train to remain inside the isolator so that one can eliminate or significantly reduce the isolator length margin. A shorter isolator will reduce the engine size, weight, skin friction drag, and thermal load improving its overall performance and efficiency.

To constrain the shock train, a control system is required. The control system is comprised of three basic elements: sense, decide, and actuate. To be effective, these elements must be combined to provide timely control of the shock train before it moves out of the isolator. Instrumentation to sense and algorithms to interpret shock train position and movement are the first elements of control. The shock location is relatively easily sensed by the sharp change in pressure it creates; however, defining an algorithm that converts sensor output to a reliable and smooth position identification, as is desired for position control, requires further consideration. The solution is a trade-off amongst instrument count, response time, computational overhead, robustness over variable operating conditions, error rejection, and accuracy. Several shock detection methods have previously been reported with varying degrees of accuracy and computational requirements. A series of computationally simple pressure-dependent methods such as the pressure-ratio and pressure rise methods, which uses the characteristic rise in pressure across the leading edge of the developed shock train may be used to determine the shock location. More involved methods use the spectral content of the pressure measurements or require a priori knowledge of the system such as the pressure summation method or the back-pressure method, which require a correlating function between the sum of the pressure measurements or the back-pressure, respectively, and the leading edge shock location. In this present disclosure, an algorithm has been devised and refined to convert sensor output to a leading-edge shock location position with an optimal balance between execution speed and accuracy.

The control system requires a suitable response time dependent on specific configurations, disturbance characteristics, scale, and operating conditions. Growth of the shock train in an isolator can occur in response to either increased backpressure at the isolator exit or decreased flow momentum at the isolator entrance. Entrance momentum or Mach number changes or disturbances will occur due to vehicle forward acceleration, but these transients will be relatively slow, on the order of seconds for a substantial change. Other disturbances resulting in distortion of the entrance flow will arise due to vehicle maneuver-induced changes to the angle of attack, and sideslip. These can be rapid at high dynamic pressure, as would be the case during a terminal maneuver of a weapon system, and when considering the non-linear behavior of shock waves and their reflections in the inlet. Similarly, atmospheric turbulence during flight can impose $\alpha$ and $\beta$ responses on a time scale set by wind shear gradients that can be large in certain instances. Backpressure disturbances will arise due to changes in the combustion behavior of the engine. Examples may include ignition, throttle-up, subsonic-supersonic combustion mode change or reverse, as well as the convergence of combustion zones fed by distributed fuel injection sites.

Fast unstart events, such as those discussed previously, require the control system to have a fast actuator to manipulate the shock train. The approach of the present disclosure is to modulate the fuel flow to the engine to control the backpressure produced by the engine and builds upon previous work in scramjet isolator shock train measurement and control. By altering the fuel flow to the combustor in real-time to control the combustor backpressure and position the shock train, nearly all of the available isolator length can be used with an only minimum margin for position uncertainty and control lag. From a complexity and weight perspective, this approach requires only the addition of instrumentation to detect where the shock train is located and a fast actuator to vary the fuel flow.

The link between sensing and actuation is through the control algorithm. The control scheme must respond rapidly and reliably to changing conditions that would cause unstart. A traditional control approach uses a proportional-integral-derivative (PID) controller that adjusts the control variable (fuel flow) to achieve the desired process variable (shock position) for the given plant (scramjet engine). The feedback loop response, accuracy, and stability are set by the gain constants for the proportional, integral, and differential elements of the controller. However, for a scramjet engine operating over a range of conditions, the gain constants will need to change. Developing this gain schedule requires a well-characterized model for the scramjet engine operation over the entire range of possible flight conditions. This presents a significant analytical, computational, and experimental challenge. The present disclosure describes the response-time requirements for an active shock position control system as determined from available sources and the work done to fulfill these target requirements. The performance of a shock position location algorithm, and of an integrated adaptive control system as compared to a conventional PID controller, in hardware-in-the-loop testing is described herein.

FIG. 1 shows a diagram of a system 100 for actively controlling shock train in a high speed, air-breathing propulsion engine, in accordance with an aspect of the disclosure. The system 100 generally includes an inlet 102, an isolator 104, a combustor 106, a main injector 109, a shock train fuel injector 300, and a nozzle 110. The inlet 102 is configured to compress via supersonic compression the incoming air before combustion. The isolator 104 is disposed between the inlet 102 and the combustor 106 and is configured to improve the homogeneity of the flow in the combustor and to extend the operating range of the engine. The combustor 106 is configured to burn gaseous fuel with atmospheric oxygen to produce heat. The shock train fuel injector 300 is located between the isolator 104 and the combustor 106. The shock train fuel injector 300 is configured to modulate fuel flow to the engine to control back pressure produced by the engine to limit unstart. The main injectors 109 are typically located between the combustor 106 and the nozzle 110 and are configured to supply fuel for combustion in the combustor 106. The nozzle 110 is configured to accelerate the heated air to produce thrust.

With reference to FIGS. 2A-D, time-resolved Schlieren images showing unstart in a simple scramjet combustor/forebody at Mach 7 are shown. Schlieren photography is a visual process that is used to photograph the flow of fluids of varying density. The images show how fast an unstart, due to an escaping shock train, can be. The indication is that unstart due to an escaping shock train can occur in less than 10 ms. Time-resolved data on unstart is not often published; however, shock tunnel tests of scramjet engines yield some examples that indicate the rate at which unstart progresses. FIGS. 2A-D shows time-resolved unstart Schlieren images for a hydrogen/silane fueled combustor being tested in a shock tunnel. The freestream flow is at an enthalpy equivalent to flight at Mach 7 into a 50 mm×100 mm rectangular isolator and combustor duct. Based on the time-stamped Schlieren images, flow through the model begins at t=0 ms and has established steady-state by 4 ms. At 8 ms the separation zone is seen moving along the forebody, and by 14 ms it has reached the forebody leading edge and the flow is completely unstarted. Based on the assumption that unstart begins at the injection point and at the time flow is established (4 ms), the unstart propagation speed can be approximated as 40 cm/(14−4) ms, or Uunstart=40 m/s.

Figure 3:
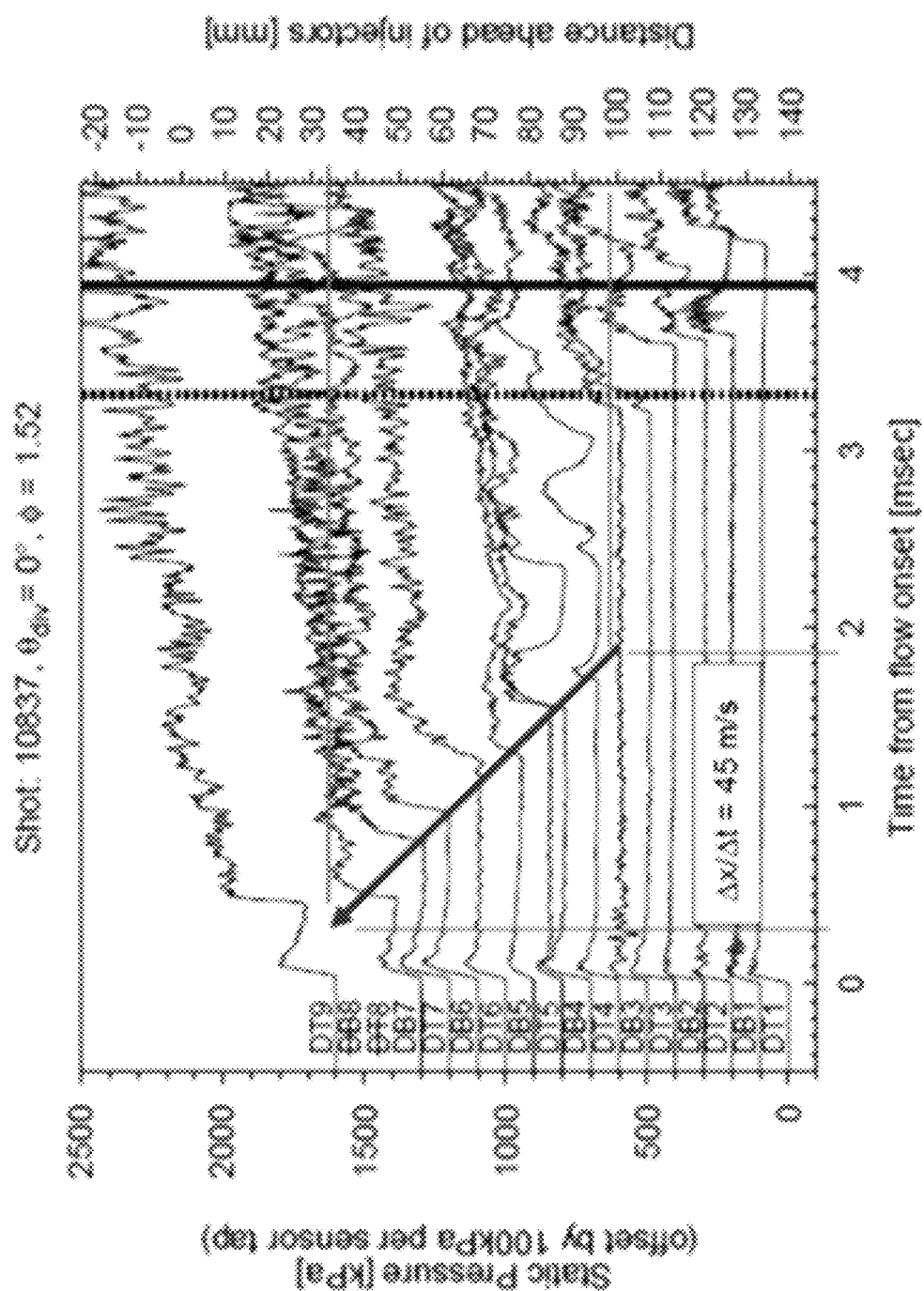
FIG. 3 is a chart of pressure-time traces of an unstart shock wave propagation in an isolator of a hydrogen fuel engine in a shock tunnel test at Mach 8 test conditions.

A second shock tunnel example uses a circular isolator with a diameter of 33 mm (1.3 inches) and a length of 4.15 L/D, connected to a hydrogen-fueled combustor of the same diameter. Shown in FIG. 3 is a time-history of pressure from sensors along the isolator for a high equivalence ratio case with $\phi$=1.52 that causes the engine to unstart. The traces on the plot are positioned such that the slope of a line connecting the successive locations of the unstart shock traversing the isolator gives its speed, Uunstart=$\Delta x/\Delta t$=45 m/s. For both cases, the response time of the controller would need to be on the order of Hduct/Uunstart~1 ms to control the position of the shock within one duct height. It is noted that unstart in both examples (see FIGS. 2A-D and FIG. 3) is severe, caused by fueling at higher than stoichiometric levels with hydrogen/silane or hydrogen fuels, which react very quickly. Therefore, it is likely that unstart will progress more slowly due to less severe disturbances and response time on the order of 10 ms achievable and its adequacy will be proven through further ground and flight test experience.

Figure 4:
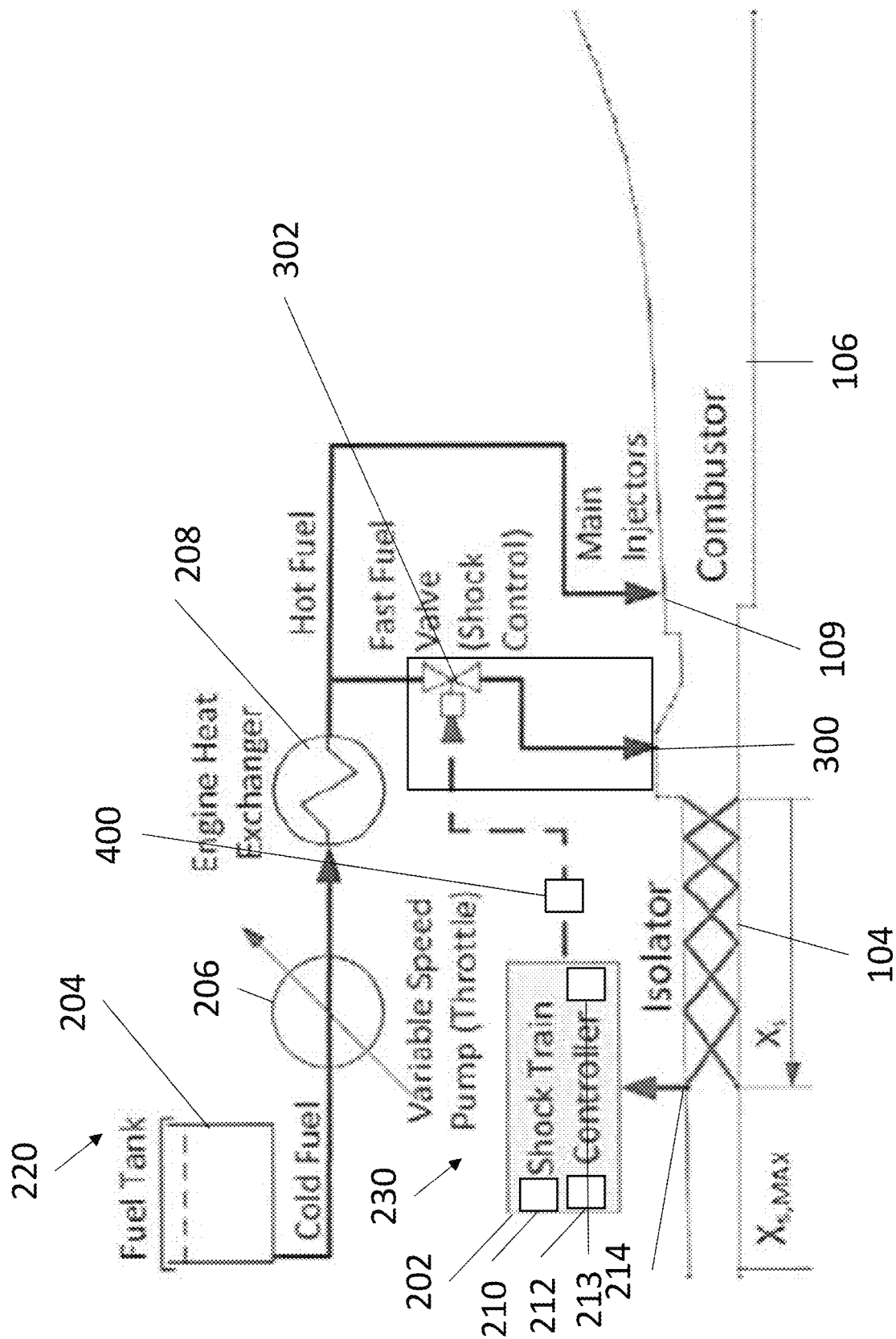
FIG. 4 is a schematic diagram of an engine throttle control system and a shock position control system of FIG. 1.

With reference to FIG. 4, a schematic diagram of an engine throttle control system 220 and a shock position control system 230 of FIG. 1 is shown. The engine throttle control system 220 includes a fuel tank 204 configured to store fuel, a main injector 109 configured to supply fuel for combustion in the combustor 10, a variable speed pump 206 (e.g., a throttle), and an engine heat exchanger 208 configured to heat the fuel. The variable speed pump 206 is configured to control the fuel supply to the main fuel injector 109 and the shock train fuel injector 300.

The shock position control system 230 generally includes a shock train fuel injector 300, a sensor 214 disposed in the isolator 104 of the engine, a fast response DI injection system 400 configured to provide any desired current schedule to the shock train fuel injector 300, and a shock train controller 202 configured to sense an input from the sensor 214 and modulate a fuel flow of the shock train fuel injector 300 based on the input from the sensor 214. The sensor 214 is configured to sense a pressure change generated by a shock train in the isolator. In various aspects, the sensor may include a pressure transducer configured to convert changes in pressure to a corresponding electrical signal.

The shock train controller 202 may include a feedback controller, a processor 210 and a memory 212 storing a database and an application. The application may include instructions that, when executed by a processor 210, cause the system 100 to perform various functions, as described below.

The feedback controller 213 may be configured to move the shock train by modulating the fuel supply to the shock train fuel injector 300 based on the sensed pressure. The feedback controller 213 may control a leading edge-shock train location position by determining when to actuate the shock train fuel injector 300, based on a position identification, and actuate the fuel flow of the shock train fuel injector. The feedback controller may include an adaptive controller.

In various embodiments, the processor 210 may be another type of processor such as, without limitation, a digital signal processor, a microprocessor, an ASIC, a graphics processing unit (GPU), field-programmable gate array (FPGA), or a central processing unit (CPU).

Memory 212 may include any non-transitory computer-readable storage medium for storing data and/or software that is executable by processor 210 and which controls the operation of shock train controller 202. In an aspect, memory 212 may include one or more solid-state storage devices such as flash memory chips. Alternatively, or in addition to the one or more solid-state storage devices, memory 212 may include one or more mass storage devices connected to the processor 210 through a mass storage controller (not shown) and a communications bus (not shown). Although the description of computer-readable media contained herein refers to solid-state storage, it should be appreciated by those skilled in the art that computer-readable storage media can be any available media that can be accessed by processor 210. That is, computer-readable storage media include non-transitory, volatile and non-volatile, removable and non-removable media implemented in any method or technology for storage of information such as computer-readable instructions, data structures, program modules or other data. For example, computer-readable storage media include RAM, ROM, EPROM, EEPROM, flash memory or other solid-state memory technology, CD-ROM, DVD, Blu-Ray or other optical storage, magnetic cassettes, magnetic tape, magnetic disk storage or other magnetic storage devices, or any other medium which can be used to store the desired information and which can be accessed by shock train controller 202.

Figure 5:
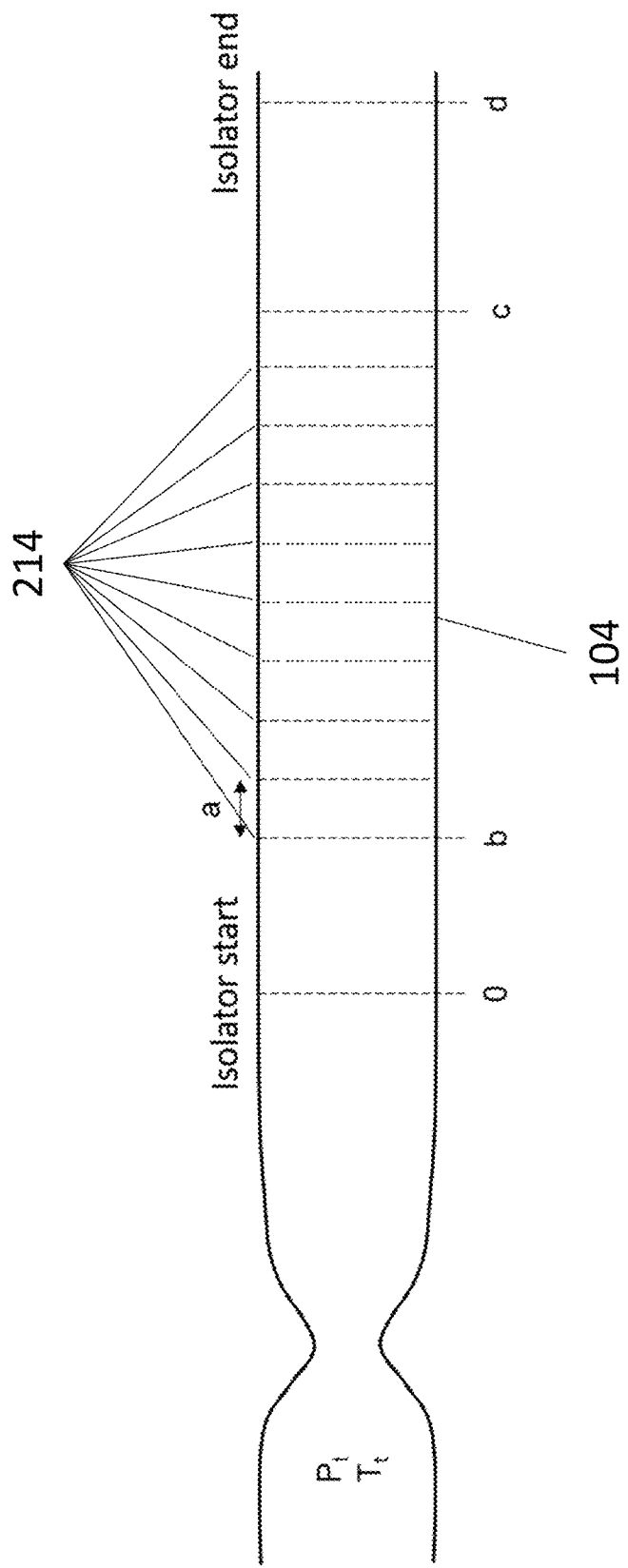
FIG. 5 is an illustration of sensor spacing in an isolator of FIG. 1.

Referring now to FIG. 5, an illustration of an isolator 104 of the system 100 of FIG. 1 is shown. Pressure readings may be taken from taps equally spaced where (a) is the pressure sensor spacing, along the isolator 104 length using sensors 214 as shown in FIG. 5. The isolator start is located at (b), (c) is the last sensor from the isolator start, and (d) is the isolator end. Pt represents stagnation pressure. Tt represents stagnation temperature. As the shock train develops with sufficient backpressure, a significant pressure rise should be detected at or between specific tap locations and allow determination of the leading-edge shock location inside the isolator.

Figure 6:
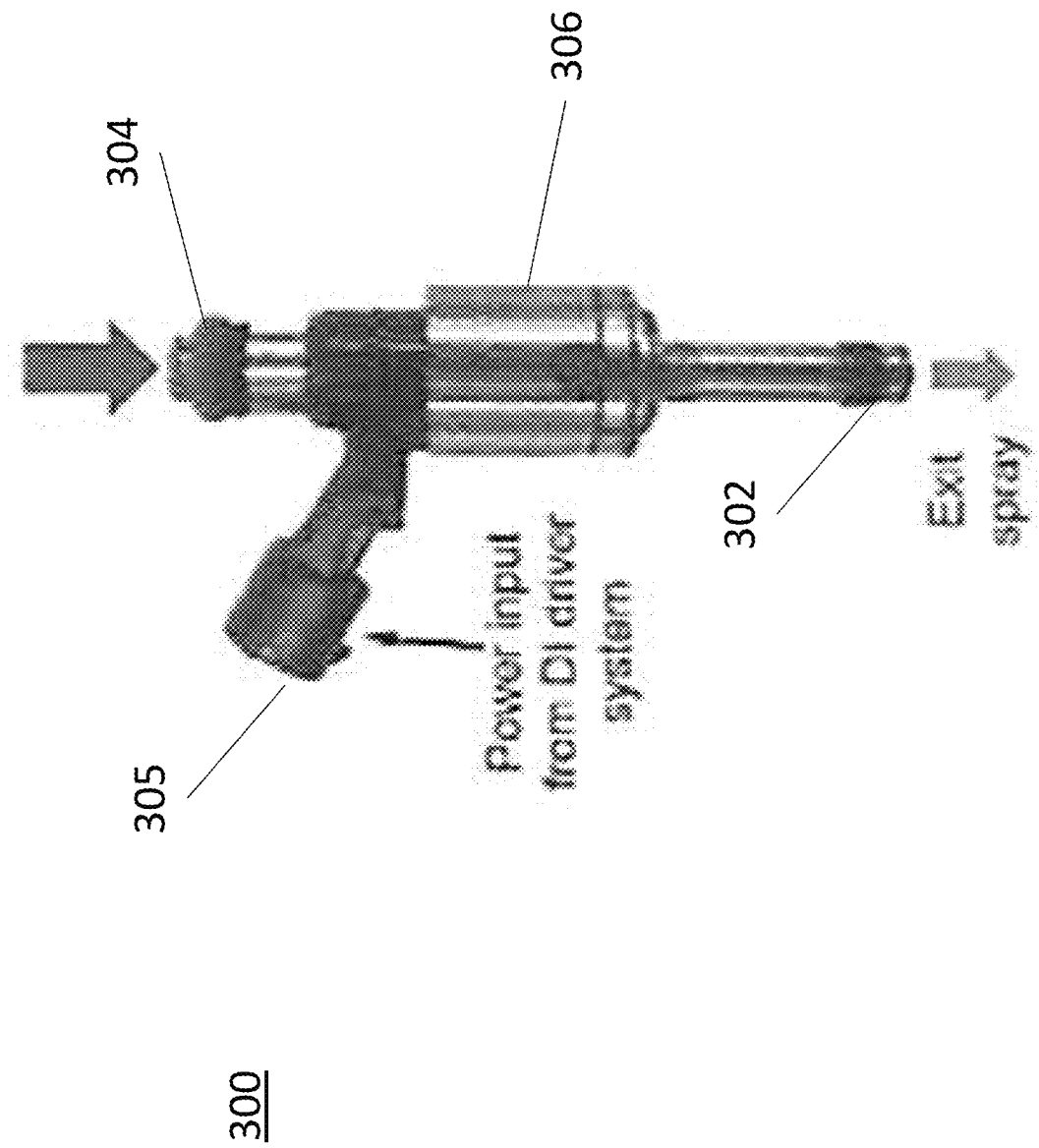
FIG. 6 is an illustration of a shock train fuel injector of the system of FIG. 1.

With reference to FIG. 6 an illustration of a shock train fuel injector 300 of the system 100 of FIG. 1 is shown. The shock train fuel injector 300 generally includes a direct injector inlet 304, a fast-acting direct injector valve 302 (e.g., an actuator) and a fuel direct injector (DI) 306 configured to supply fuel to the combustor 109 of the engine. The direct injector inlet is configured to receive fuel from a fuel source. The fast-acting direct injector valve 302 is configured to control fuel flow from the direct injector 306 to the combustor 106 of the engine to control back pressure produced by the engine to limit unstart. In various embodiments, the direct injector includes an end face. In various embodiments, the fast-acting direct injector valve 302 is disposed on the end face of the direct injector 306. The valving occurs at the tip of the direct injector 306 where the fuel spray emanates eliminating any delay between fast-acting direct injector valve 302 movement and fuel flow change. This allows very fast fuel control as the direct injector 306 eliminates the lag time between the action of the fast-acting direct injector valve 302 and a change in the fuel flow rate. In various embodiments, the shock train fuel injector 300 may include a commercial off the shelf automotive direct injector. In various embodiments, the fuel valving may occur slightly upstream of the injection point so that the fuel volume between the fast-acting direct injector valve 302 and the direct injector 306 is minimized which then also minimizes the delay between fast-acting direct injector injector valve 302 movement and fuel flow change. For example, the system may sense a pressure change within about 1 millisecond. The system may determine the pressure sensing shock position within about 0.6 or 0.7 milliseconds. The system may then take about 2.5 milliseconds to actuate the fuel. Therefore, the shock position control system will have a response time of about 4 or 5 milliseconds. By comparison, the plant response time can be on the order of about 50 milliseconds. Accordingly, the ratio of the shock position control system response to the plant system (e.g., engine) response may be as low as about 1:5 and as high as about 1:10, depending on the operating frequency of the PWM power amplifier, which can be between about 200 Hz to about 400 Hz.

Figure 7:
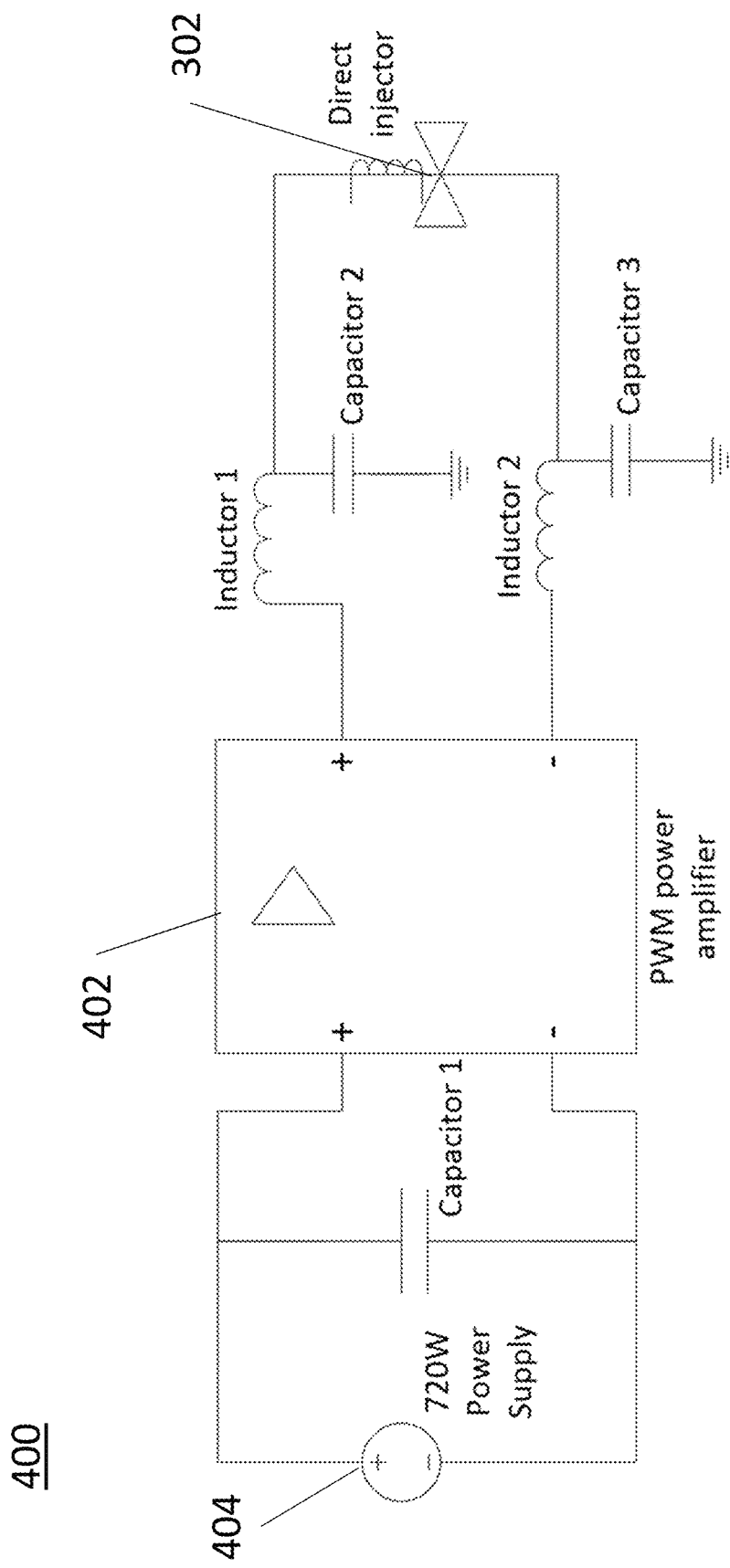
FIG. 7 is a schematic of a direct injector driver circuit.
Figure 8:
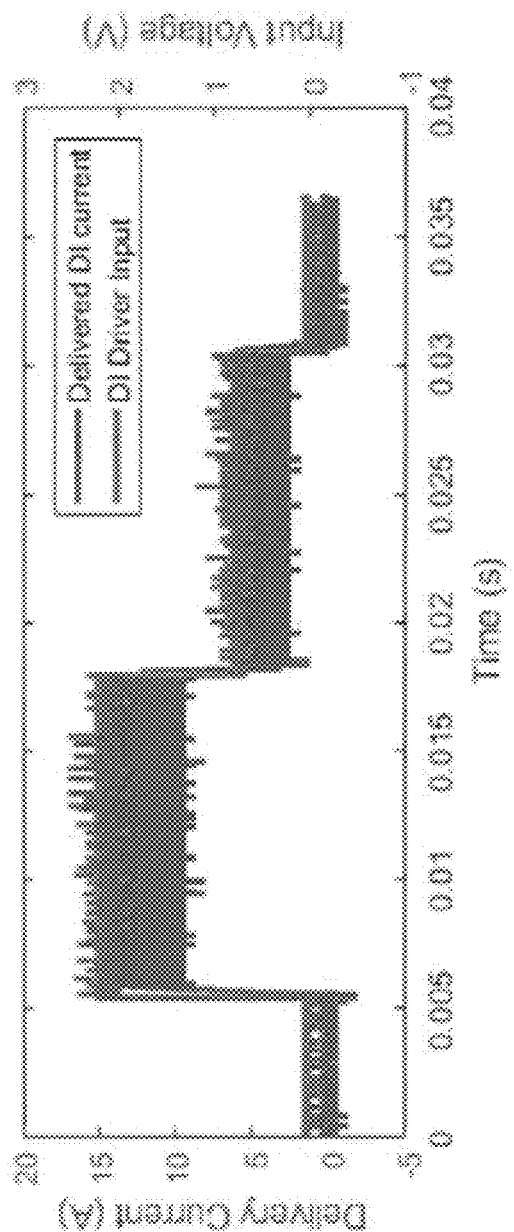
FIG. 8 is an example two-stage current control scheme.

For example, an automobile fuel direct injector (DI), may be used as an actuator for the feedback control tests with the control algorithm. Jet fuel (e.g., JP-7), may be supplied to the direct injector inlet 304. A fast response DI injection system 400 using the circuit constructed in FIG. 7, which includes a motor driver as the PWM power amplifier 402, may be used. The PWM power amplifier 402 may be used to provide any desired current schedule to the shock train fuel injector 300 and consists of a DC power supply 404, a capacitor (e.g., to achieve minimal solenoid energizing times) and an input control signal. The output current is modulated by the PWM power amplifier 402 to match the input control signal shape at a substantially higher power level. The PWM power amplifier enables a two-stage current control scheme, facilitating significantly faster injector opening and closing times and an onboard current monitor allowing for precise tuning of the power stage schedule. The shorter period between open cycles will allow the direct injector to operate at higher frequencies. After tuning the circuit and adding the appropriate electrical shielding, the desired two-stage current output from the motor driver is shown in FIG. 8. A 0-10 V control signal may be fed into the amplifier and converted into the desired 0-15 A current profile to maximize the injector response without impacting the volumetric flow rate. Both the input signal and current may be monitored as seen in FIG. 8. Performance may be achieved using an initial 'peak' current enabling sharp flow rate rise times followed by a lower 'holding' current allowing the solenoid to close more quickly and lower the temperature generated by the injector (due to the decrease in average power). This may be verified with a high-frequency response optical sensor to capture the timing of the injection spray from the DI relative to the start of the input actuation signal to the shock train fuel injector 300.

Figure 9:
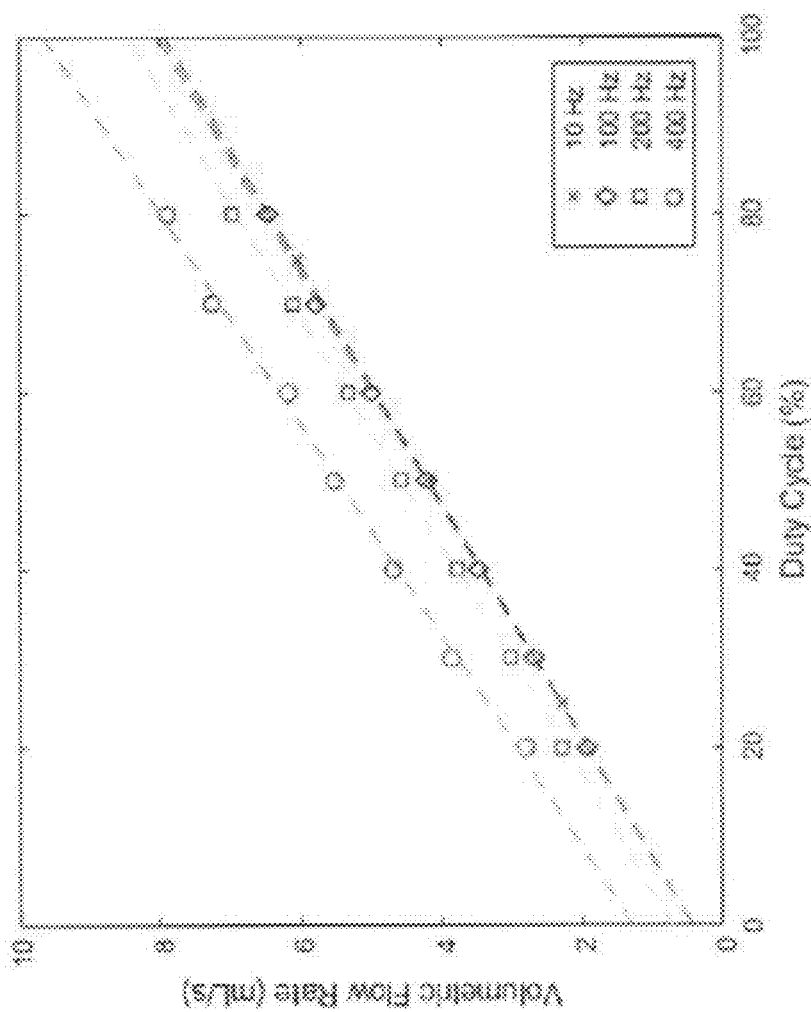
FIG. 9 is a graph of volumetric flow rate of water vs DI duty cycle at various frequencies.

Referring to FIG. 9, a graph of volumetric flow rate of water vs DI duty cycle at various frequencies is shown. To verify the shock train fuel injector 300 linear operating regions, the volumetric flow rate may be measured as a function of the duty cycle of the shock train fuel injector 300 injection at different constant operating frequencies from 10 to 400 Hz as shown in FIG. 9. The duty cycle is defined as the percentage of the cycle that contains the two-stage current profile. The DI driver system 400 may be able to control volumetric flow rate up to approximately 400 Hz while maintaining a linear relationship for a broad range of duty cycles. At faster PWM rates, the closing time becomes more substantial relative to the actual open time of the injector, resulting in the positive volumetric flow rate shift when increasing the DI operating frequency. These characterization tests demonstrate the direct injector with the DI driver system is a suitable fast-acting actuator that can operate with a high response time (to at least 2.5 ms) with a linear volumetric flow rate output over a wide range of control input.

Figure 10:
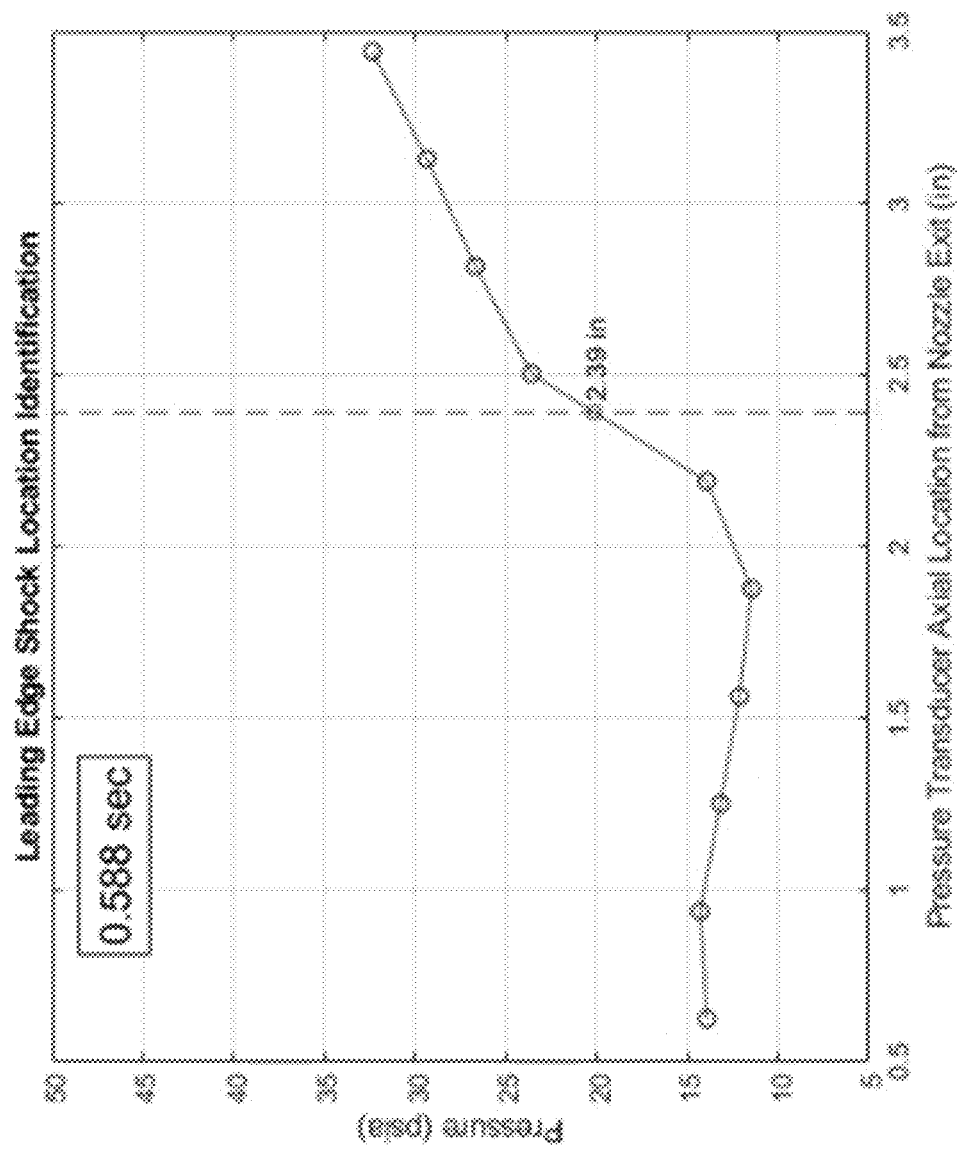
FIG. 10 is a graph showing the leading edge shock location.

Referring now to FIG. 10, a graph showing the Leading Edge Shock Location Identification Algorithm (LESLA) is shown. In order to verify and control the isolator shock train location to prevent unstart a robust, yet computationally facile real-time algorithm to convert incoming sensor data into shock position must be implemented. Direct pressure measurements along the isolator length can easily distinguish the leading edge of the shock train due to the abrupt rise in the pressure at the first transducer downstream; however, further processing of the pressure data is necessary to accurately and reliably pinpoint this leading edge. There are several methods for accurately determining the shock train leading-edge while fulfilling the necessity of being used in real-time with minimal processing delay. Methods that are independent of absolute pressure values are the most robust for implementation across a range of potential operating conditions and were adapted for the current work.

In a typical pressure measurement scenario, axial pressure measurements along the isolator create a spatial pressure distribution, as shown in FIG. 10, with a pressure rise due to the applied system backpressure beginning at the leading-edge shock location, in this case near the center of the isolator. The Leading Edge Shock Location Algorithm (LESLA), as described in the present disclosure, identifies the rapid increase of pressure and tracks it with reasonable accuracy as observed in experiments where the shock train is made to shift along the isolator. To verify the existence of the shock train in the isolator, the backpressure of the system was varied to change the spatial pressure distribution as shown in FIG. 10. The application of the leading-edge shock position algorithm shows accurate tracking of the shock position as it travels downstream to upstream of the isolator. This demonstrates that the bench-top isolator rig can generate a shock train and control its movement within the isolator with sufficient backpressure.

To meet the target response of the control system, which includes the shock identification algorithm, the algorithm was refined to reduce its computational overhead without compromising identification accuracy and reliability. Since the spatial pressure distribution is generated at the set rate of the pressure transducer frequency (1 kHz in the isolator test rig), the algorithm ideally must process each distribution and output the corresponding shock position before the next spatial distribution is generated and fed into the algorithm. Therefore, the algorithm performance metric is primarily based on the processing time per spatial pressure distribution. With the ten pressure transducer measurements in the isolator setup shown in FIG. 5, using a general-purpose multitasking operating system with a quad-core, 2.8 GHz base operating frequency processor, the algorithm processes each distribution in approximately 0.5 ms. Note that the algorithm performance can be improved with higher clock frequency cores or increasing the number of processor cores.

The effect of the number of pressure measurements on the algorithm performance was also investigated. Increasing the density of axial pressure transducers along the isolator improves the resolution of the spatial distribution. This in turn will increase the accuracy of the shock position algorithm. However, since the algorithm uses geometric curve fits, it is conceivable that increasing the number of pressure measurements per distribution will impact the algorithm processing speed. Using the data from the bench-top isolator rig, a collection of pressure distributions that correspond to shock positions that span the entire isolator length produce a surface. The surface may be interpolated, creating a simulated model surface, and used to generate pressure distributions with the desired number of simulated pressure measurements by taking a slice of the surface at a constant z-factor value, which represents a single pressure distribution. A group of pressure distributions with a certain number of pressure measurements was fed into LESLA to test its processing speed per distribution. These results show that there is negligible performance impact up to 50 pressure measurements per distribution.

Figure 11:
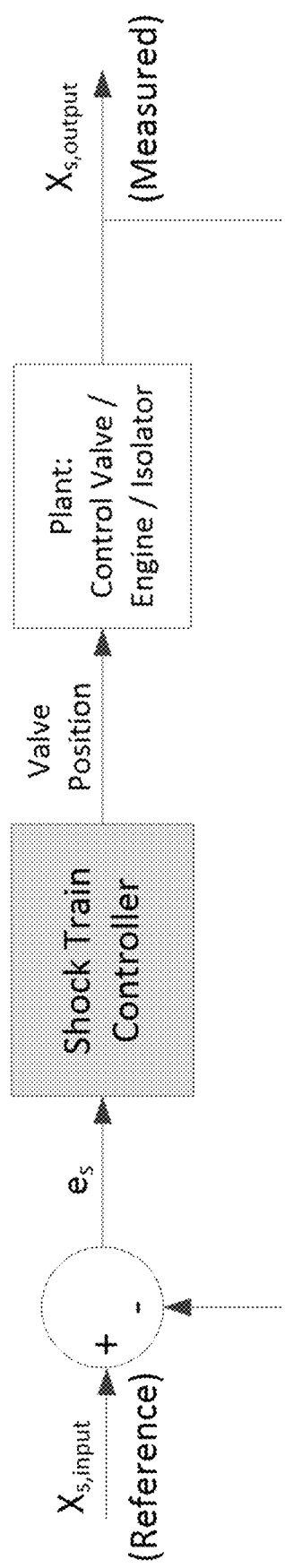
FIG. 11 is a block diagram of a feedback loop with the shock train controller and scramjet plant.

With reference to FIG. 11, a block diagram of a feedback loop with the shock train controller 202 and scramjet plant is shown. Feedback controllers' architectures were implemented in the control systems tested in the present disclosure. In an engine throttle system for a scramjet, schematically shown in FIG. 4, the feedback controller 213 would maintain the leading edge of the shock position at the desired static or dynamic location(s), depending on flight operation and scramjet inlet conditions. The feedback controller 213 controls fast-acting fuel valves, which, in turn, provide the necessary backpressure in the combustor to counteract any transient disturbances or long time-scale changes to the shock location. Closing the feedback loop, the shock location detection algorithm will provide the necessary location information to the feedback controller to again actuate the controlled valve as necessary to maintain the current shock location setpoint.

In various embodiments, direct pressure measurements along the isolator length can easily distinguish the leading edge of the shock train due to the abrupt rise in the pressure at the first transducer downstream, however, further processing of the pressure data is necessary to accurately and reliably pinpoint this leading edge. In various embodiments, the Leading Edge Shock Location Algorithm (LESLA), is a geometry-based method that is capable of identifying the leading-edge location of a shock train without the need for a priori calibration or relying on absolute pressure values in varying fluid-dynamic conditions.

In various embodiments, LESLA is subdivided into three distinct sections: (1) the fitting; (2) the intersection identification and (3) the intersection selection. The first section involves employing a least squares regression method with a minimizing method (e.g. Levenberg-Marquardt, gradient descent, etc.) and a weighted cost-function regularization least squares regression to represent the pressure distribution in two geometrically distinct manners. The second section identifies the intersection points between two representations and performs a modified Bentley-Ottmann type algorithm to efficiently find all intersection instances. The third and last section utilizes a decision tree that categorizes and filters the intersection elements to obtain the desired and correct element, which is determined to be equivalent to the leading-edge shock location. Each input distribution is processed in the same manner and a single output leading-edge shock location is determined.

There are several existing methods for accurately determining the shock train leading edge. However, LESLA is unique and the most advanced by having three attributes that other methods lack: (1) ability to be used in real-time with minimal processing delay; (2) zero dependence on a priori calibrations; (3) accurate distinction between pressure rises due to the existence of the shock train in the isolator and all other non-relevant pressure rises (e.g. sensor noise, inlet distortion-induced shock waves, etc.). The combination of all three properties allows LESLA to accurately identify the leading-edge shock position in supersonic isolators of varying scale and inlet fluid-dynamic properties in a computationally facile manner.

The purpose of the feedback controller is to minimize the error between the measured and reference parameter. A general structure of the shock location feedback controller is shown in FIG. 11. In reference to the system 100, the shock train controller, or the control algorithm, will modulate its input to minimize the difference between the desired leading-edge shock location and the actual shock location, determined by LESLA. The output of the controller will affect the direct injector output, which in turn affects the system plant, which in this case is the isolator test rig. The plant will respond to the valve output and affect the movement of the shock train in the isolator. LESLA will quantify this change as a leading-edge shock train location. The error will then be compared again to the shock location setpoint and the controller will act accordingly to minimize it in the next iteration.

A dual-mode scramjet engine is a particularly complex system with numerous physical time-scales that are not completely understood. The presence or lack of a pre-combustion shock train in the isolator affects both fuel mixing and combustion phenomena with its length being a function of inlet flow conditions and combustion back pressure, both of which may change rapidly with varying flight conditions and performance requirements. Finally, the operating characteristics may change entirely if engine damage occurs or unforeseen flight conditions are encountered. In addition to the physical challenges, numerical models that can accurately predict scramjet performance are still in development and not currently suited to the development of real-time controllers.

Figures 12A, 12B:
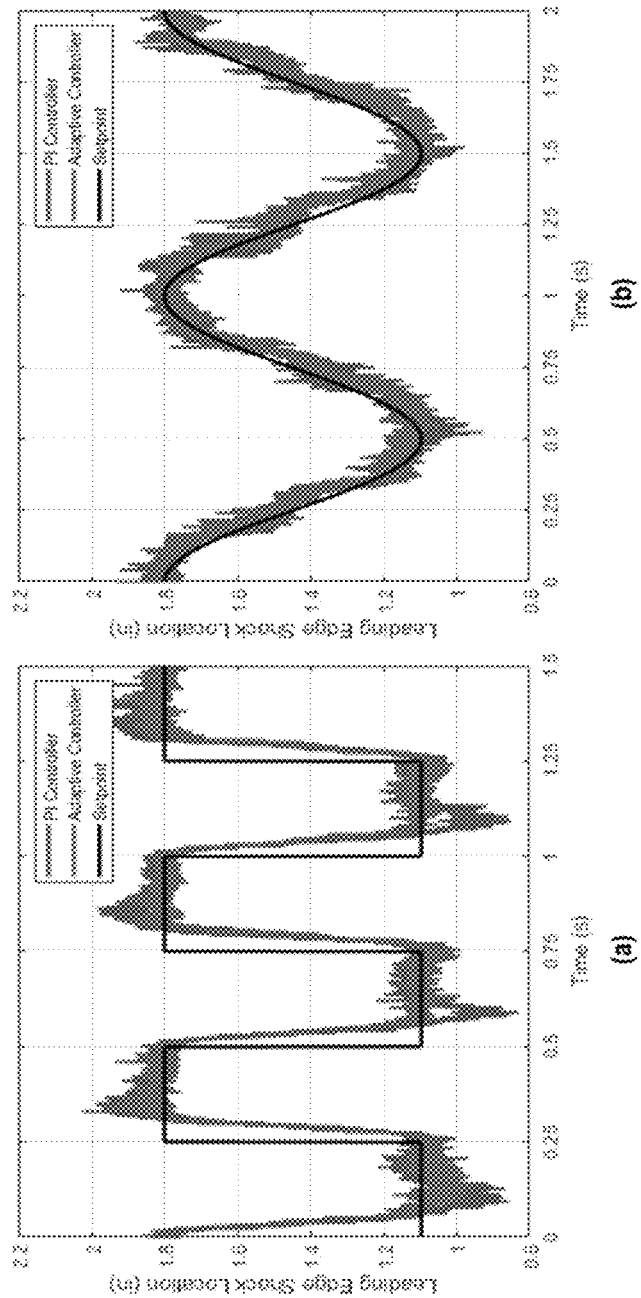
FIGS. 12A and B are graphs of DI closed-loop (a) step and (b) sine response of the adaptive controller and PI controller.

Referring now to FIGS. 12A and 12B a series of closed-loop tests are shown. In various embodiments, the closed-loop excursions with the isolator benchtop rig successfully demonstrated the adaptive controller's performance compared with the PID controller using the DI as the mass addition actuators. As shown in FIGS. 12A. and 12B the adaptive controller and the PID controller are able exhibit suitable shock location control given step changes in the setpoint using the DI. Similarly, both controllers also performed well with sinusoidal varying setpoints. The response time of the system using the DI was 50 ms, 80% or more of which was due to fluid dynamic lag in the isolator system.

Figure 13:
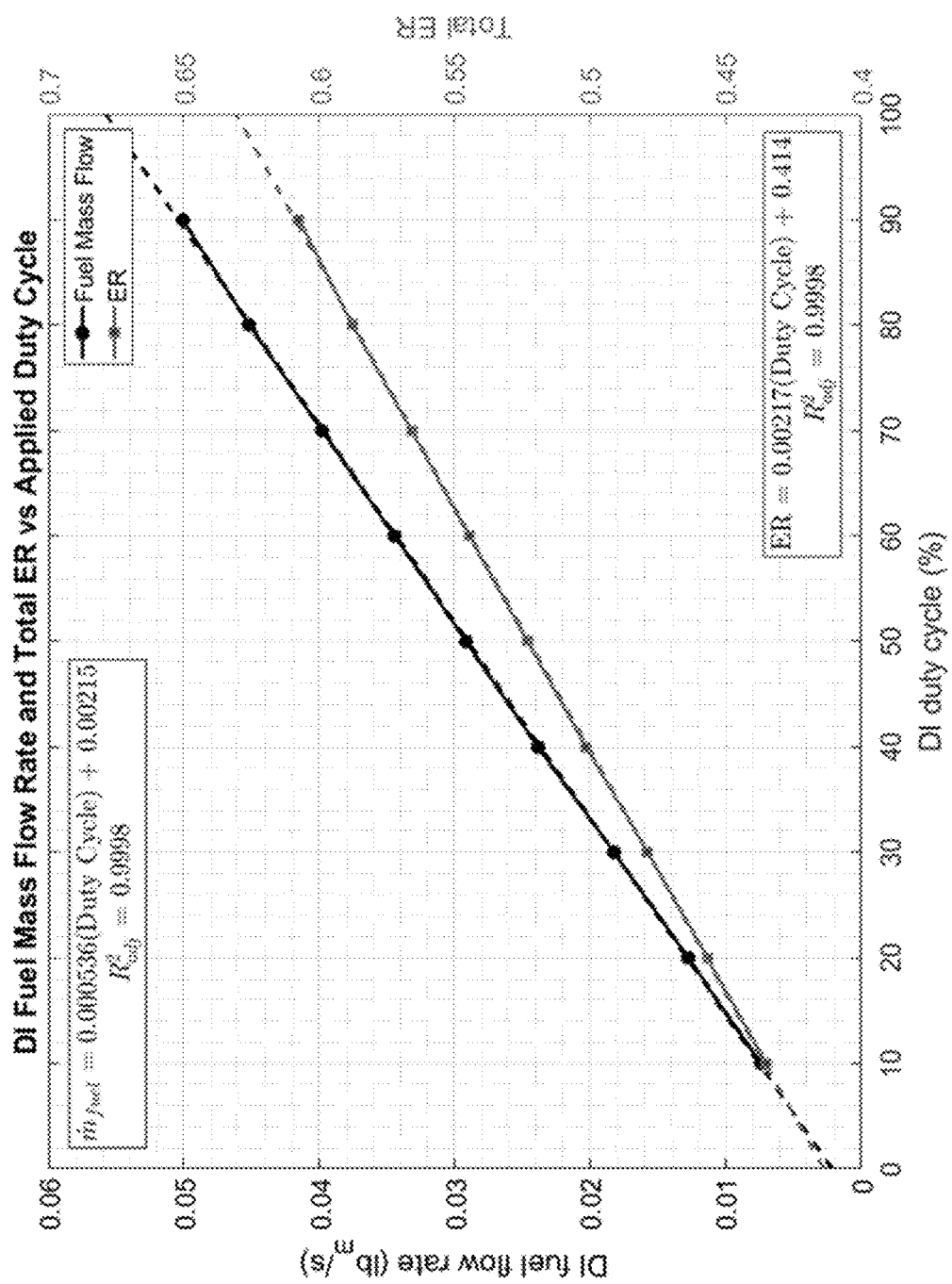
FIG. 13 is a graph of a characterization of the fuel flow rate and resulting ER with duty cycle change.

To create the dynamic fuel map of the DI system, the duty cycle of the DI was stepped from 10% to 90% in 10% increments while a mass flow meter recorded the total mass flow rate through both injectors. The total ER was calculated using the combined fuel mass flow rate into the combustion and the measured total air mass flow rate through the direct-connect rig. FIG. 13 shows the relatively high linearity of DI fuel flow rate and the respective ER to its command input.

The closed-loop test used a control system consisting of the DI as the controlled fuel valve, the PID or adaptive controller as the controller and the leading edge shock location, identified by LESLA, as the controlled variable. Desired shock location control was achieved with the adaptive controller, particularly using the DI as the fuel actuator. The gains of the PID controller and initial input variables of the adaptive controller were obtained using the open-loop step response by system identification. Unfortunately, after a few preliminary tests, the PID controller was unable to converge after a setpoint change using the DI, therefore its performance could not be assessed.

Figure 14:
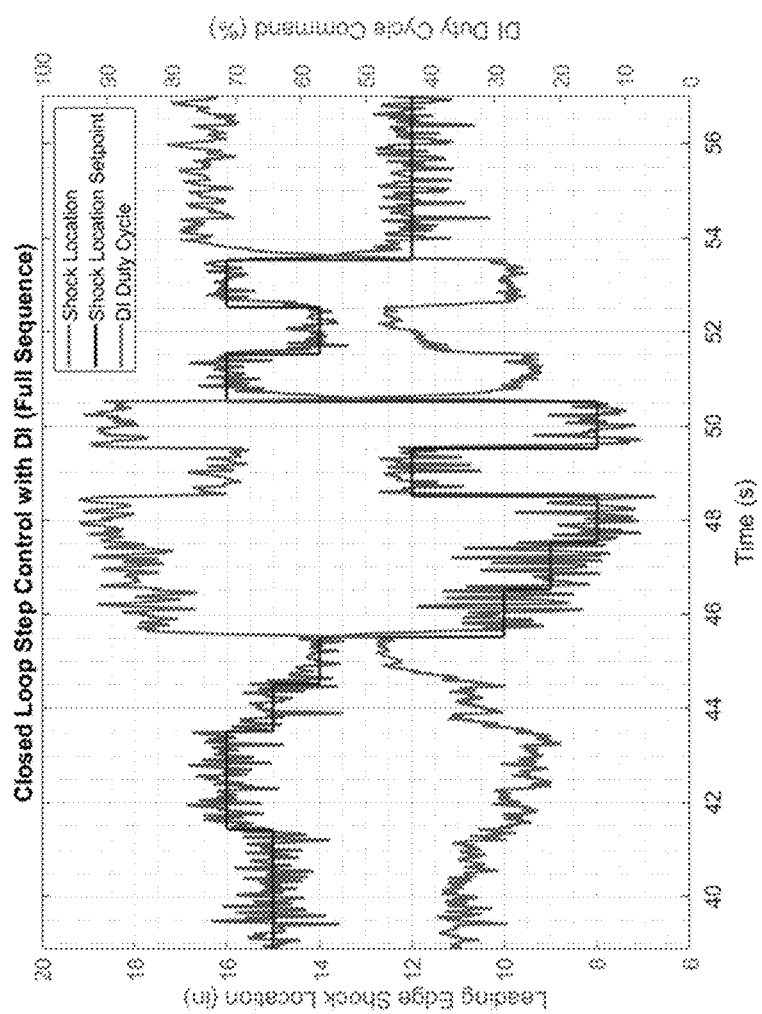
FIG. 14 is a graph showing closed-loop step control test results using the ACAC and DI.

A series of one-second duration step changes to the shock location setpoint was the input to the adaptive controller and the DI command was modulated according to the controller to meet the identified shock location as close as possible to the shock location setpoint and as fast as possible to setpoint changes. The overall closed-loop step test with the adaptive controller and DI is shown in FIG. 14, in which the shock location setpoint, the commanded DI duty cycle and the identified shock location are plotted together. The DI is able to control the shock location generally to within ±1 inch of the shock location setpoint or 0.66 of the duct height and as close as ±0.5 inches in some regions of the isolator. At some isolator locations, the controller is actively changing the valve command while the setpoint is constant, indicating system-related variation events were successfully negated to maintain the desired shock location.

Figure 15:
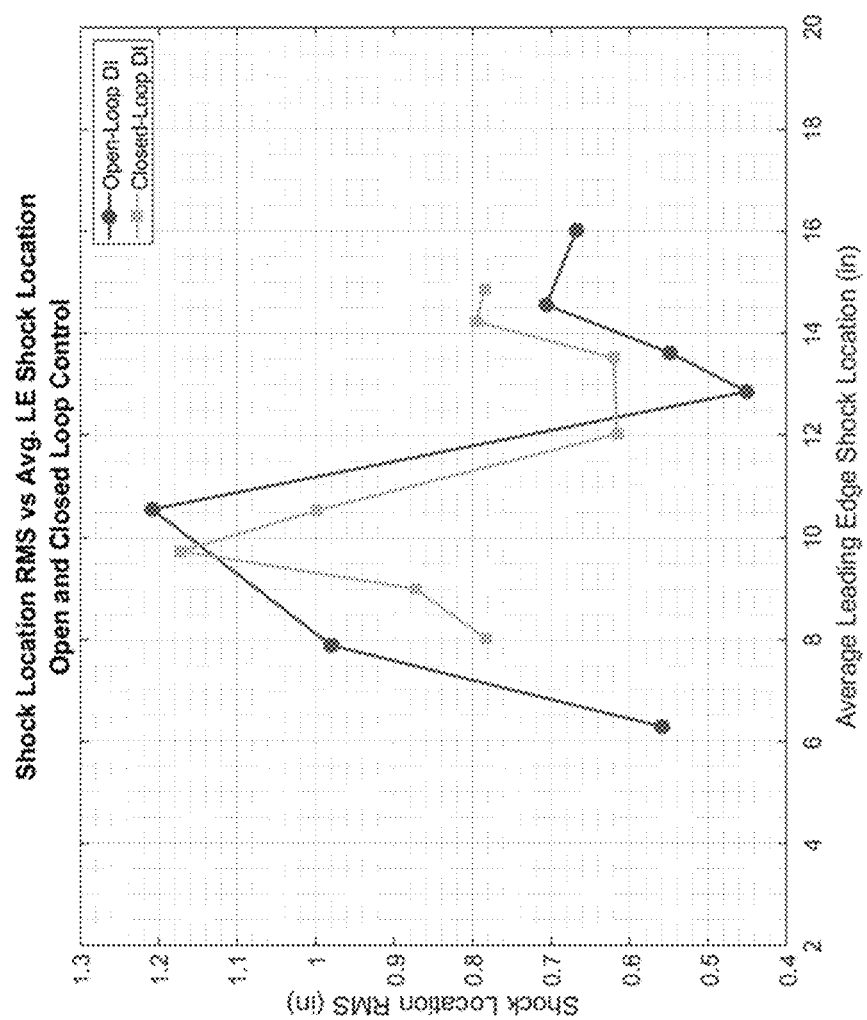
FIG. 15 is a graph showing a comparison of the shock location RMS at different average shock locations using open-loop and closed-loop operation of the DI.

To evaluate the adaptive controller performance, the shock location RMS at different leading edge shock locations was compared, shown in FIG. 15, between the DI operating in open-loop, using manual DI commands, and closed-loop, using the adaptive controller to command the DI. Overall, the open and closed-loop RMS are similar. The closed-loop RMS is lower closer to the upstream end of the isolator, which is provides lower risk of unstart when locating the leading edge shock location close to the start of the isolator. This demonstrates that active control of the shock location by the fuel actuator reduces unstart occurrences compared to open-loop operation of the fuel actuator.

As seen previously from the open-loop static DI characterization, there is non-linearity in the isolator that causes the shock location to behave differently at different regions of the isolator given the same DI duty cycle value at different times or same change in DI duty cycle. This effect was also observed in the closed-loop tests with the DI using the adaptive controller.

Figures 16A, 16B, 16C, 16D:
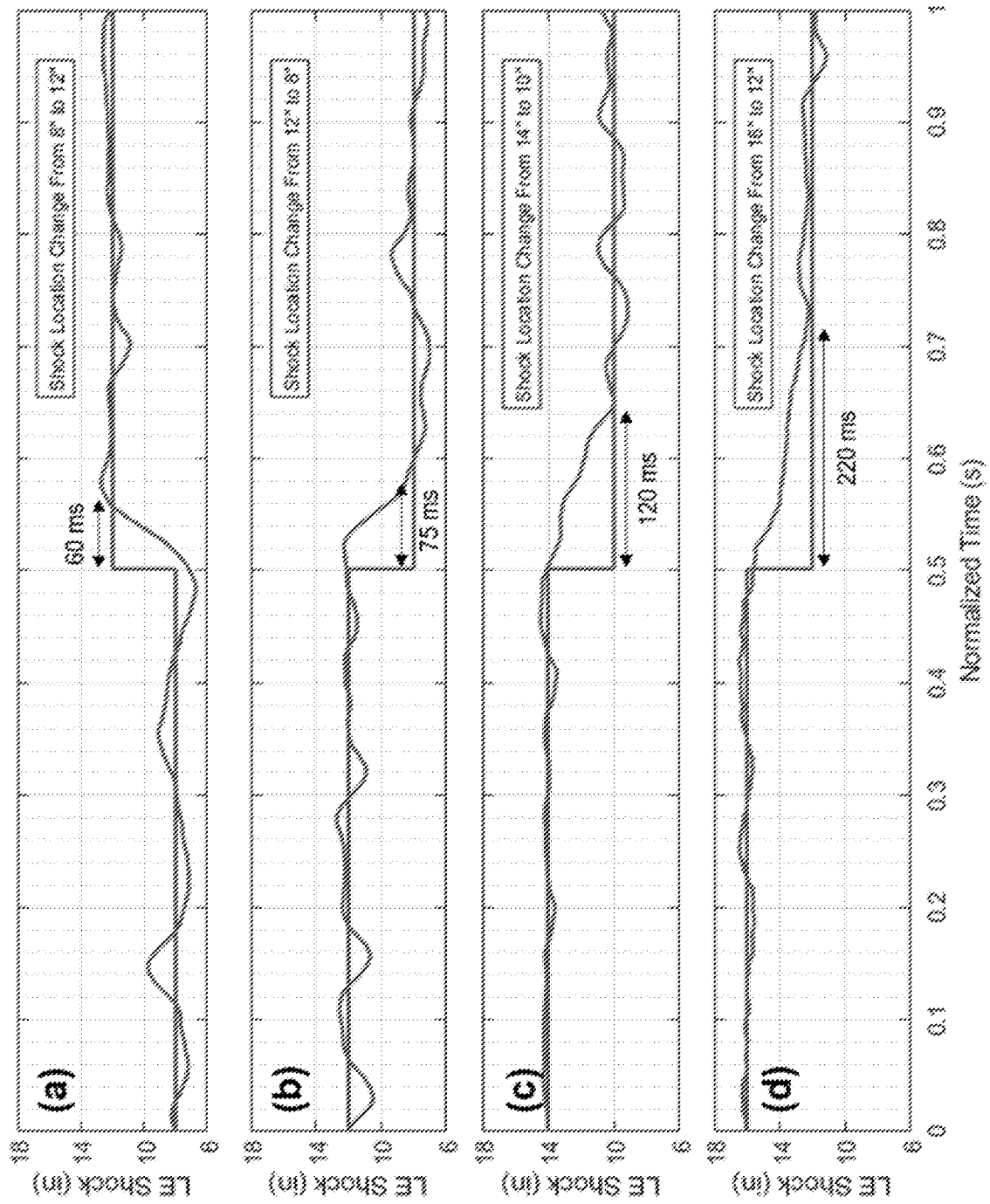
FIG. 16A-D are graphs showing the closed-loop step response of DI with 4 inch shock location setpoint changes in various isolator regions.

Referring to FIG. 16 is a collection of shock location setpoint step changes of the same magnitude, 4 inches of the isolator length, in different sections of the isolator with closed loop control of the DI. Near the upstream end of the isolator, the controller response to a 4' inch setpoint change is rapid, requiring 50 to 60 ms before converging to the new setpoint. This is truly moving the setpoint either upstream or downstream of the isolator in the upstream section. At the midsection or downstream end of the isolator, the convergence response time to the new setpoint is lengthened; it takes 140 ms to move the shock location from 14 inch to the 10 inch location and nearly 220 ms to move from the location from the 16 inch to the 12 inch location. The distribution in response time is likely caused by the engine-associated non-linearity and the adaptive controller response to this non-linearity.

Figure 17:
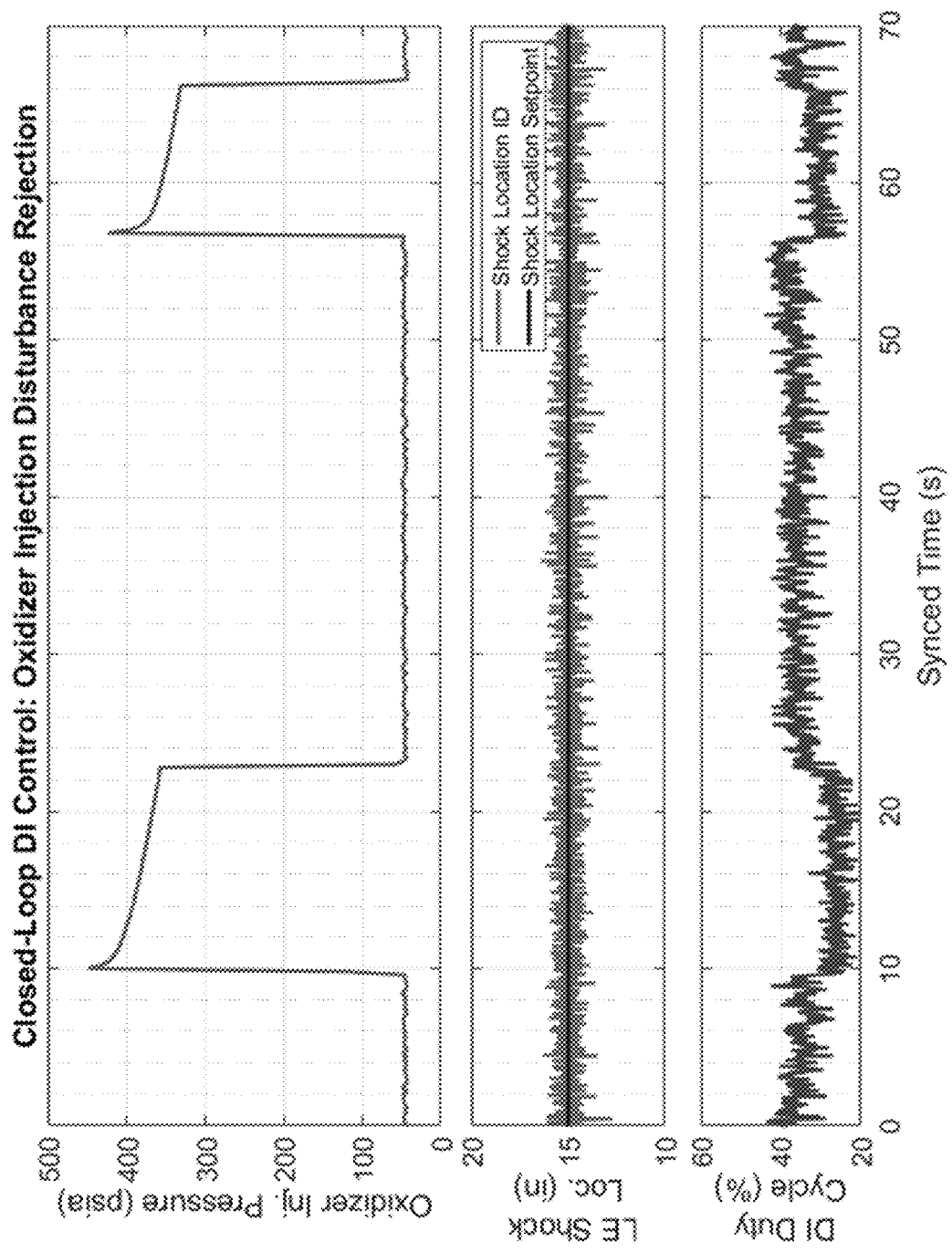
FIG. 17 is a graph of Steady-state leading edge shock location RMS at different isolator locations in the open-loop end-plug and open-loop DI actuation tests.

Further closed-loop testing was performed by assessing the ability of the adaptive controller to reject any combustion-related disturbances. The disturbance sources available during the direct-connecting testing were injection of 400 psia oxidizer or 200 psia ethylene directly into the combustor cavity using fast-acting solenoid valves. In the closed-loop disturbance rejection test with oxidizer injection, shown in FIG. 17, the shock location setpoint was held at 15 inches from the start of the isolator. Two oxidizer injection events, each lasting approximately 10 seconds, were performed while the adaptive controller is active. The shock location, despite both injection events, was maintained at the setpoint without any noticeable deviations from the nominal shock location spread. The only indication that the controller was active is the decrease in DI duty cycle during the oxidizer injection events. This is expected as the oxidizer injection would move the shock location upstream, however, the controller will negate this movement by decreasing the DI duty cycle to move the shock location further downstream. The uncontrolled oxidizer disturbance magnitude was not measured with an open-loop test with the oxidizer injection, however, it is estimated to be about a 3 inch (2 duct heights) equivalent shock movement from the controlled duty cycle change.

Active control of the shock system in a scramjet engine isolator opens possibilities for enhanced engine performance and reduced engine weight by eliminating the need for excess isolator length margin. A successful system will allow for maximum performance from a given engine configuration and will deliver range and efficiency that exceeds those possible using passive unstart control. The system dynamics of a scramjet isolator shock train movement have been shown, based on available data, to require a high-frequency response control system.

The elements of the control system including the shock location sensing system (sensor(s) and LESLA), the fast-acting direct injection system and the control algorithm have been assessed for frequency response and accuracy through hardware-in-the-loop testing. A fast response bench-top isolator rig was built for testing the integrated control components using the direct injector valve as an aero-throttle controller for the isolator. LESLA is very fast, capable of sub-millisecond capture of shock position from an axial line of pressure sensor data. The approach has the added benefit of not requiring expected or known pressure levels ahead of or behind isolator shock train which offers application potential over broad operating ranges. Fuel control via direct fuel injection has demonstrated a fast response and has a linear fuel flow rate response for a wide command input range. Tests in the direct-connect scramjet rig at the AFRL RC-18 facility have successfully controlled and maintained the leading edge shock location using the direct injector as the controlled fuel actuator and adaptive controller as the controller. The DI fuel flow rate can be modulated with highly linearly to its duty cycle input command. The DI in both open-loop and closed-loop tests have fast response times up to about 50 ms. In contrast, existing commercial fuel actuators in the scramjet rig have a significantly slower response time of about 850 ms in open-loop valve characterization. Dynamically, the DI is capable of up to about 3 Hz while existing commercial fuel actuators is near 1 Hz operation at the negative 3 dB cutoff. The drop-off in the DI frequency response is likely attributed to the engine response time.

In closed-loop testing, the DI can be controlled with the adaptive controller without issues meeting the user-defined shock location setpoints. The adaptive controller-DI control system has demonstrated to have relatively fast response ranging from 50 ms to 200 ms depending on the isolator region of control. In the oxidizer and ethylene disturbance tests, the control system was capable of mitigating the disturbances completely in most instances, with room to improve both the controller and DI actuation speeds for larger disturbances. Similar closed-loop testing using the adaptive controller and an existing commercial fuel actuator to maintain a desired shock location reliably were not successful due to the slower actuator dynamic response.

Figure 18:
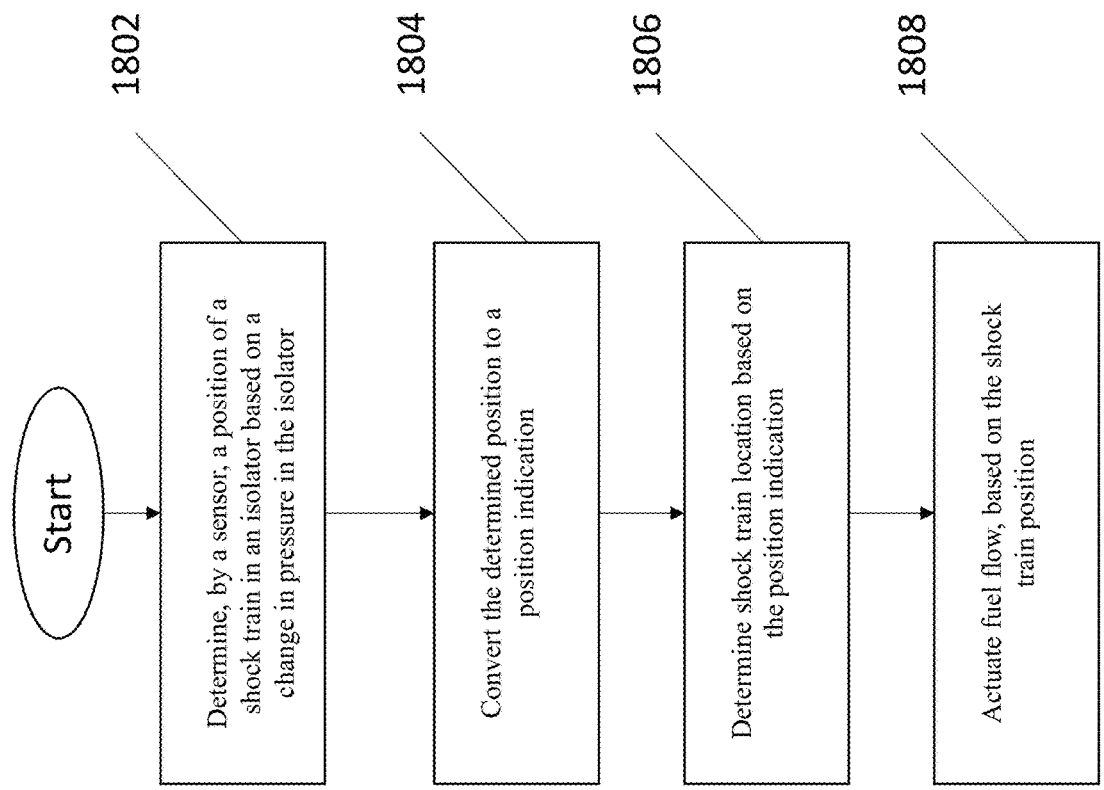
FIG. 18 is a block diagram of a method for actively controlling shock train in a high speed, air-breathing propulsion engine.

With reference to FIG. 18, an exemplary block diagram of a method for actively controlling shock train in a high speed, air-breathing propulsion engine, in accordance with aspects of this disclosure is shown. The following description will refer to the system, but it will be understood that such description is exemplary and does not limit the scope and applicability of this disclosure.

Initially, at step 1802, the shock train controller 202 determines a position of a shock train in an isolator 104 based on a change in pressure in the isolator 104. In various embodiments, a sensor 112 (e.g., a pressure transducer) disposed in the isolator 104 converts changes in pressure to a corresponding electrical signal. The shock train controller 202 reads the electrical signal and uses this signal to determine the shock train position relative to the isolator based on the sensed pressure change to establish a shock train position. In various embodiments, multiple sensors may be used to determine the shock train position.

Next, at step 1804, the shock train controller 202 converts the determined position to a position identification. In various embodiments, the position identification includes a leading-edge shock location position.

Next, at step 1806, the shock train controller 202 determines shock train location based on the position identification. For example, the shock train controller 202 may determine that the shock train may be located closer to a distal end of the isolator 104, based on the position identification.

Next at step 1808, the shock train controller 202 actuates fuel flow, based on the determined shock train position, from a shock train fuel injector 300 to the engine to control back pressure produced by the engine to limit unstart. In various embodiments, the actuating is controlled by a feedback controller including a closed-loop control algorithm or an adaptive controller. In various embodiments, the system includes a pulse width modulation (PWM) power amplifier configured to control fuel flow to the engine by providing current to the fast-acting direct injector valve. In various aspects, the shock train controller 202 controls the leading edge-shock train location position by: determining when to actuate the shock train fuel injector based on a determined position identification, and causing the shock train fuel injector to inject fuel flow based on the determined position identification. In various embodiments, the feedback controller 213 minimizes the difference between a desired leading-edge shock location and an actual shock location, wherein the actual shock location is as determined by the determined position.

The aspects disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ this disclosure in virtually any appropriately detailed structure.

The phrases "in an embodiment," "in embodiments," "in various embodiments," "in some embodiments," or "in other embodiments" may each refer to one or more of the same or different embodiments in accordance with this disclosure.

It should be understood that the description herein is only illustrative of this disclosure. Various alternatives and modifications can be devised by those skilled in the art without departing from the disclosure. Accordingly, this disclosure is intended to embrace all such alternatives, modifications and variances. The embodiments described are presented only to demonstrate certain examples of the disclosure. Other elements, steps, methods, and techniques that are insubstantially different from those described above and/or in the appended claims are also intended to be within the scope of the disclosure.

What is claimed is:

1. A system for actively controlling shock train in a high speed, air-breathing propulsion engine, the system comprising:
   an isolator;
   a sensor disposed in the isolator, the sensor configured to sense a pressure change generated by a shock train in the isolator;
   a shock train fuel injector;
   a processor operatively coupled to the sensor; and
   a memory, with instructions stored thereon, the instructions, when executed by the processor, cause the system to:
      sense, by the sensor, the pressure change to establish a sensed pressure change;
      determine a position of the shock train relative to the isolator based on the sensed pressure change to establish a shock train position; and
      communicate with the shock train fuel injector based on the shock train position to enable the shock train fuel injector to modulate fuel flow to the engine to control back pressure produced by the engine to limit unstart.

2. The system of claim 1, wherein the instructions when executed by the processor further cause the system to:
   convert the determined shock train position to a position identification, wherein the position identification includes a leading-edge shock location position; and
   control the leading edge-shock train location position by a feedback controller, wherein the feedback controller is configured to control the shock train fuel injector, which in turn controls the back pressure produced by the engine.

3. The system of claim 1, wherein the processor has a feedback controller.

4. The system of claim 1, wherein the sensor includes a pressure transducer.

5. The system of claim 1, wherein the shock train fuel injector includes:
   a direct injector inlet configured to receive fuel from a fuel source;
   a direct injector configured to supply the fuel to the engine; and
   a fast-acting direct injector valve configured to modulate the flow of the fuel to control back pressure produced by the engine.

6. The system of claim 5, wherein the system further includes a pulse width modulation (PWM) power amplifier configured to control fuel flow to the engine by providing current to the fast-acting direct injector valve.

7. The system of claim 2, wherein controlling the leading edge-shock train location position includes:
   determining when to actuate the shock train fuel injector based on the position identification; and
   causing the shock train fuel injector to modulate the fuel flow when a determination to actuate the shock train fuel injector is communicated by the feedback controller to the shock train fuel injector.

8. The system of claim 5, wherein the fast-acting direct injector valve is disposed on an end face of the direct injector.

9. The system of claim 2, wherein the feedback controller minimizes a difference between a desired leading-edge shock location and an actual shock location.

10. The system of claim 1, wherein the system is configured to move the position of the shock train relative to the isolator in about 10 milliseconds or less.

11. The system of claim 1, wherein a ratio of a response time of the system to a response time of the engine may be as low as about 1:5 and as high as about 1:10.

12. The system of claim 2, wherein the shock train fuel injector is disposed in electrical communication with the feedback controller.

13. A system for actively controlling shock train in a high speed, air-breathing propulsion engine, the system comprising:
   an isolator;
   a sensor associated with the isolator, the sensor configured to sense changes in pressure generated by a shock train in the isolator; and
   a shock train fuel injector in electrical communication with the sensor, the shock train fuel injector configured to modulate fuel flow to the engine to control back pressure produced by the engine in response to predetermined pressure changes in the shock train.

14. The system of claim 13, further comprising a feedback controller in electrical communication with the sensor and the shock train fuel injector.

15. The system of claim 13, wherein the sensor includes a pressure transducer.

16. The system of claim 13, wherein the shock train fuel injector includes:
- a direct injector inlet configured to receive fuel from a fuel source;
- a direct injector configured to supply the fuel to the engine; and
- a fast-acting direct injector valve configured to modulate the flow of the fuel to control back pressure produced by the engine.

17. The system of claim 16, wherein the system further includes a pulse width modulation (PWM) power amplifier that provides current to the fast-acting direct injector valve.

18. A method for actively controlling a shock train in a high speed, air-breathing propulsion engine, the method comprising:
- determining, by a sensor, a change in pressure in an isolator of the scramjet engine system;
- determining a location of a leading-edge of a shock train in the isolator based on the change in pressure in the isolator determined by the sensor; and
- actuating a shock train fuel injector in electrical communication with the sensor to modulate fuel flow in a scramjet engine of the scramjet engine system based on the location of the leading-edge of the shock train in the isolator to control back pressure produced by the scramjet engine system.

19. The method of claim 18, wherein the method further includes:
- controlling the location of the leading edge of the shock train by a feedback controller in electrical communication with the sensor.

20. The method of claim 17, wherein the steps of determining, by the sensor, the change in pressure in the isolator, determining the location of a leading-edge of the shock train in the isolator, and actuating the shock train fuel injector are effectuated within about 10 milliseconds or less.

* * * * *